(12) United States Patent
Goto

(10) Patent No.: US 11,496,616 B2
(45) Date of Patent: Nov. 8, 2022

(54) HANDS-FREE DEVICE, DATA TRANSFER METHOD, AND COMPUTER PROGRAM PRODUCT

(71) Applicant: Panasonic Intellectual Property Management Co., Ltd., Osaka (JP)

(72) Inventor: Kiwamu Goto, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 17/142,798

(22) Filed: Jan. 6, 2021

(65) Prior Publication Data

US 2021/0289066 A1 Sep. 16, 2021

(30) Foreign Application Priority Data

Mar. 16, 2020 (JP) .............................. JP2020-045019

(51) Int. Cl.
*H04M 1/60* (2006.01)
*H04M 1/72466* (2021.01)

(52) U.S. Cl.
CPC ..... *H04M 1/6075* (2013.01); *H04M 1/72466* (2021.01)

(58) Field of Classification Search
CPC ........................ H04M 1/6075; H04M 1/72466
See application file for complete search history.

(56) References Cited

U.S. PATENT DOCUMENTS

| | | | |
|---|---|---|---|
| 2010/0062714 A1 | 3/2010 | Ozaki | |
| 2011/0270935 A1* | 11/2011 | Tozaki | H04M 1/6091 709/206 |
| 2012/0196583 A1 | 8/2012 | Kindo | |
| 2014/0066133 A1 | 3/2014 | Ozaki | |
| 2015/0229748 A1 | 8/2015 | Ozaki | |
| 2017/0085692 A1 | 3/2017 | Ozaki | |
| 2018/0255165 A1* | 9/2018 | Ozaki | H04M 1/57 |
| 2019/0289112 A1 | 9/2019 | Ozaki | |

FOREIGN PATENT DOCUMENTS

| | | |
|---|---|---|
| JP | 2002-0193046 | 7/2002 |
| JP | 2006-199281 | 8/2006 |
| JP | 2007-104184 | 4/2007 |
| JP | 2007104184 A * | 4/2007 |
| JP | 2011-226969 | 11/2011 |

(Continued)

*Primary Examiner* — Yuwen Pan
*Assistant Examiner* — Angelica M Perez
(74) *Attorney, Agent, or Firm* — Greenblum & Bernstein, P.L.C.

(57) ABSTRACT

A hands-free device according to the present disclosure includes a memory and a processor coupled to the memory. The processor is configured to: connect to a cellular phone in a hands-free telephone conversation-enabled manner pursuant to HFP; receive from the cellular phone at least one of outgoing call history data, incoming call history data, unattended incoming call history data, and telephone directory data stored in the cellular phone by a communication protocol pursuant to PBAP; and receive, when the cellular phone receives a voice message or an answerphone record, at least one of information on the voice message and information on the answerphone record from the cellular phone.

9 Claims, 30 Drawing Sheets

(56) References Cited

FOREIGN PATENT DOCUMENTS

| JP | 2017-126995 | 7/2017 |
|----|----|----|
| WO | 2008/069299 | 6/2008 |
| WO | 2010/032360 | 3/2010 |
| WO | 2011/043072 | 4/2011 |
| WO | WO 2011043072 A1 * | 4/2011 |

* cited by examiner

FIG.11A

| OUTGOING CALL HISTORY DATA | | |
|---|---|---|
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |
| JIRO NOMURA | 090×××××××× | AUGUST 10 10:15 |

FIG.11B

| TELEPHONE DIRECTORY DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.11C

| OUTGOING CALL HISTORY DATA | | |
|---|---|---|
| ICHIRO KATO | 090×××××××× | AUGUST 10 13:40 |
| TARO ABE | 090×××××××× | AUGUST 10 12:15 |
| HANAKO SATO | 090×××××××× | AUGUST 10 12:00 |
| TARO ABE | 090×××××××× | AUGUST 10 11:20 |
| KAZUO TANAKA | 090×××××××× | AUGUST 10 11:10 |
| KAZUO TANAKA | 090×××××××× | AUGUST 10 10:50 |

← REGISTERED NAMES OF TELEPHONE DIRECTORY DATA ARE DISPLAYED

FIG.12A

| INCOMING CALL HISTORY DATA | | |
|---|---|---|
| ICHIRO KATO | 090××××××× | AUGUST 10 13:00 |
| AIKO HAYASHI | 090××××××× | AUGUST 10 12:25 |
| ROKURO MORI | 090××××××× | AUGUST 10 11:45 |
| ICHIRO KATO | 090××××××× | AUGUST 10 11:15 |
| SHICHIRO YAMADA | 090××××××× | AUGUST 10 11:10 |
| HACHIRO UEDA | 090××××××× | AUGUST 10 10:20 |

FIG.12B

| TELEPHONE DIRECTORY DATA | |
|---|---|
| ICHIRO KATO | 090××××××× |
| GORO OKADA | 090××××××× |
| SHIRO MORI | 090××××××× |
| JIRO YAMADA | 090××××××× |
| ICHIRO YOSHIMOTO | 090××××××× |
| SABURO WATANABE | 090××××××× |
| ... | 090××××××× |

FIG.12C

| INCOMING CALL HISTORY DATA | | |
|---|---|---|
| ICHIRO YOSHIMOTO | 090××××××× | AUGUST 10 13:25 |
| ICHIRO KATO | 090××××××× | AUGUST 10 13:00 |
| AIKO HAYASHI | 090××××××× | AUGUST 10 12:25 |
| ROKURO MORI | 090××××××× | AUGUST 10 11:45 |
| ICHIRO KATO | 090××××××× | AUGUST 10 11:15 |
| SHICHIRO YAMADA | 090××××××× | AUGUST 10 11:10 |

← REGISTERED NAMES OF TELEPHONE DIRECTORY DATA ARE DISPLAYED

FIG.13A

| UNATTENDED INCOMING CALL HISTORY DATA | | |
|---|---|---|
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |
| KAZUO OMURA | 090×××××××× | AUGUST 10 10:24 |

FIG.13B

| TELEPHONE DIRECTORY DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.13C

| UNATTENDED INCOMING CALL HISTORY DATA | | |
|---|---|---|
| SABURO WATANABE | 090×××××××× | AUGUST 10 12:46 |
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |

← REGISTERED NAMES OF TELEPHONE DIRECTORY DATA ARE DISPLAYED

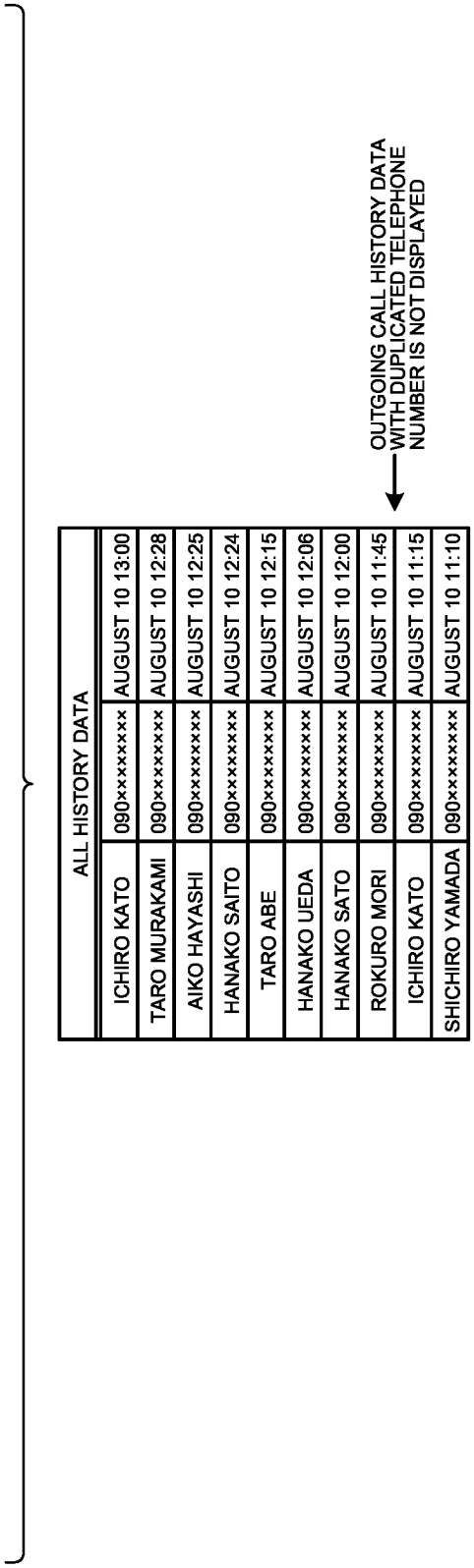

| OUTGOING CALL TELEPHONE NUMBER | OUTGOING CALL DATE AND TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

} OUTGOING CALL HISTORY DATA AUTOMATICALLY TRANSFERRED FROM CELLULAR PHONE

(b)

| OUTGOING CALL TELEPHONE NUMBER | OUTGOING CALL DATE AND TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

} OUTGOING CALL HISTORY DATA OF HANDS-FREE DEVICE

} OUTGOING CALL HISTORY DATA AUTOMATICALLY TRANSFERRED FROM CELLULAR PHONE

| INCOMING CALL TELEPHONE NUMBER | INCOMING CALL DATE AND TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} INCOMING CALL HISTORY DATA AUTOMATICALLY TRANSFERRED FROM CELLULAR PHONE

(b)

| INCOMING CALL TELEPHONE NUMBER | INCOMING CALL DATE AND TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} INCOMING CALL HISTORY DATA OF HANDS-FREE DEVICE

} INCOMING CALL HISTORY DATA AUTOMATICALLY TRANSFERRED FROM CELLULAR PHONE

FIG.19
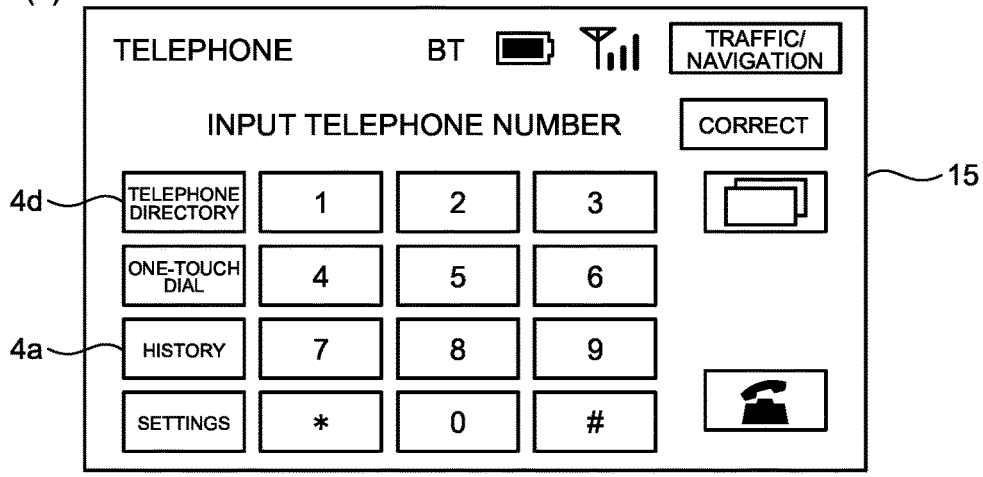
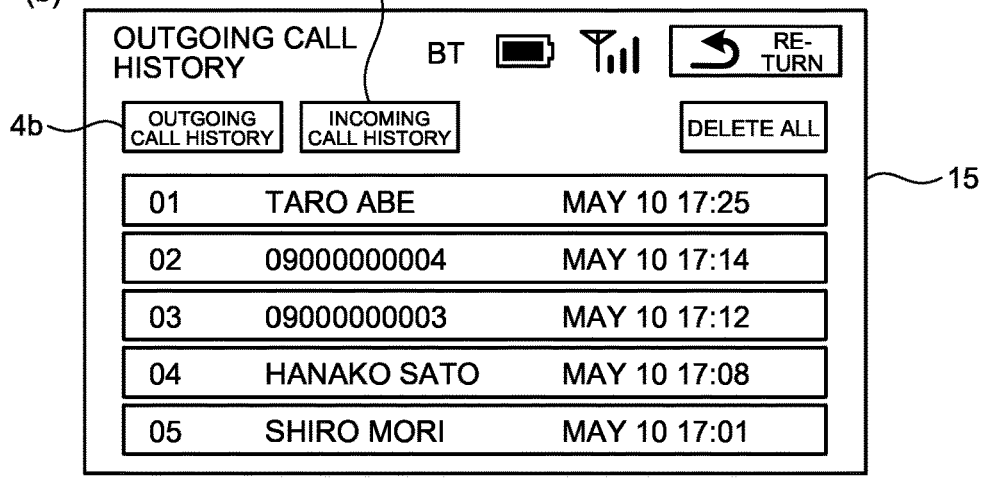
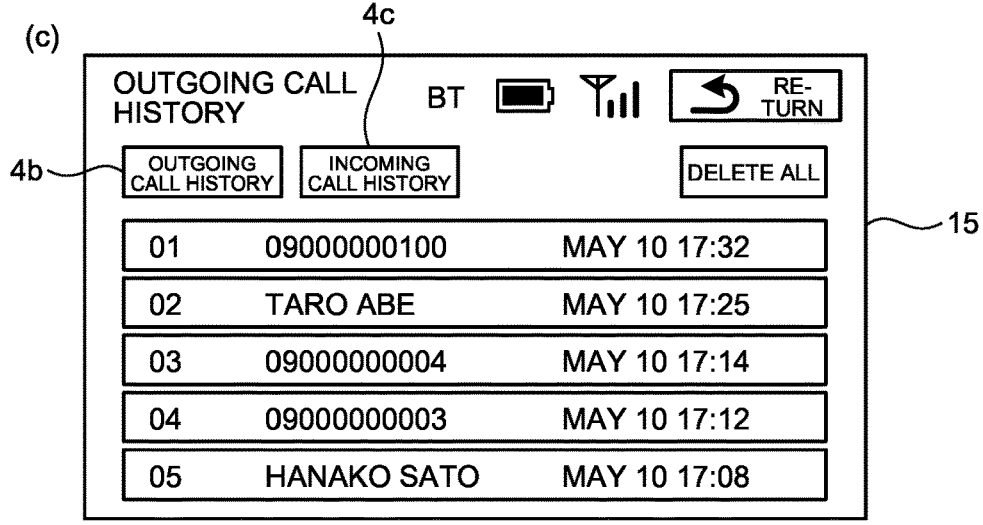

FIG.20
(a)
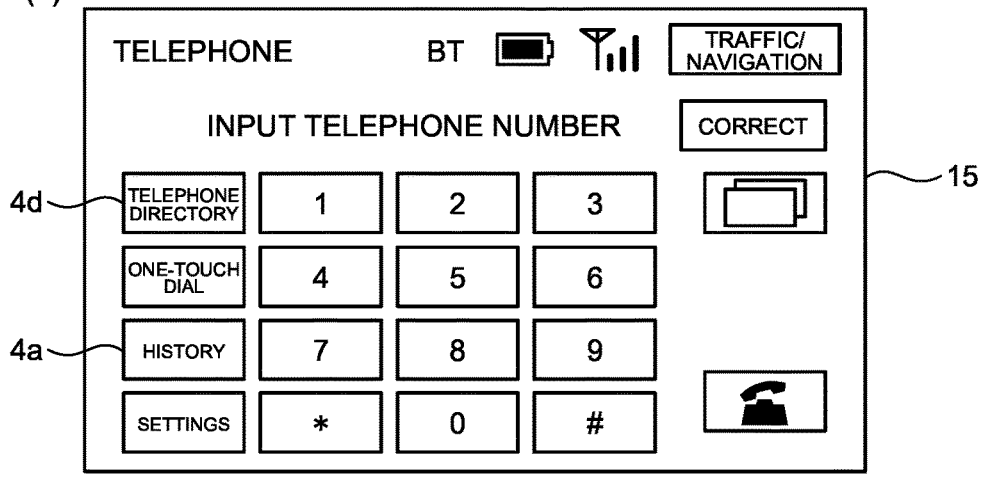
(b)
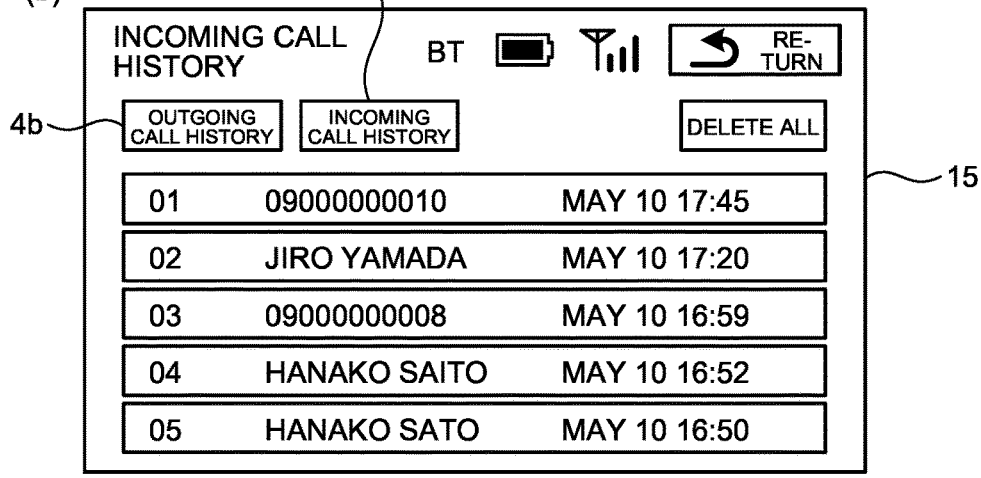
(c)
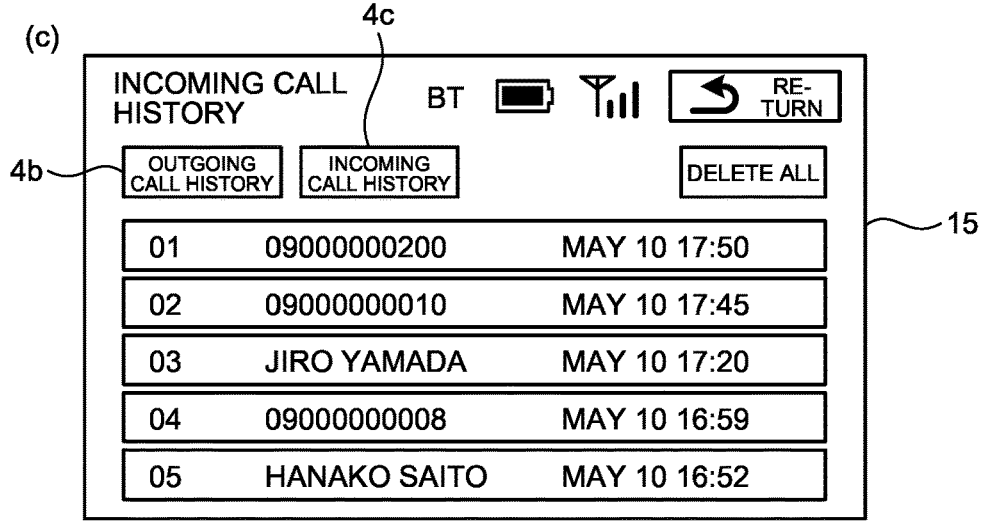

FIG.21
(a)
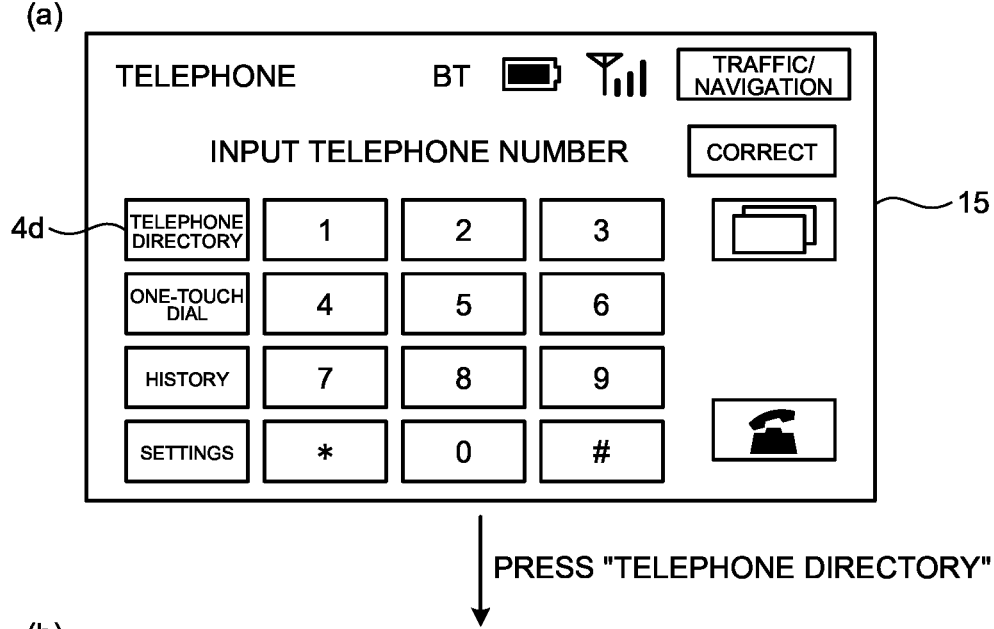
↓ PRESS "TELEPHONE DIRECTORY"
(b)
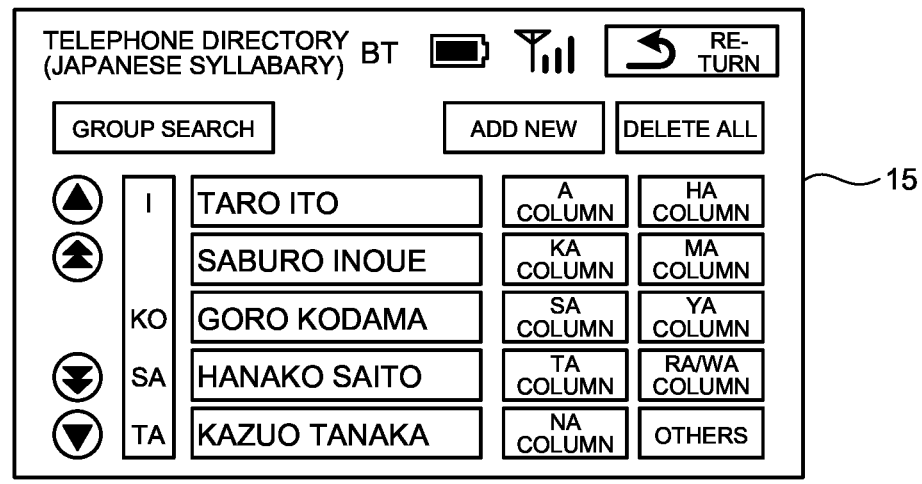

FIG.22

| TELEPHONE NUMBER | REGISTERED NAME |
|---|---|
| 09000000001 | KAZUO TANAKA |
| 09000000002 | TARO ITO |
| 09000000005 | TARO ABE |
| 09000000006 | SHIRO MORI |
| 09000000007 | GORO KODAMA |
| 09000000009 | HANAKO SAITO |
| ⋮ | ⋮ |

FIG.24
(a)
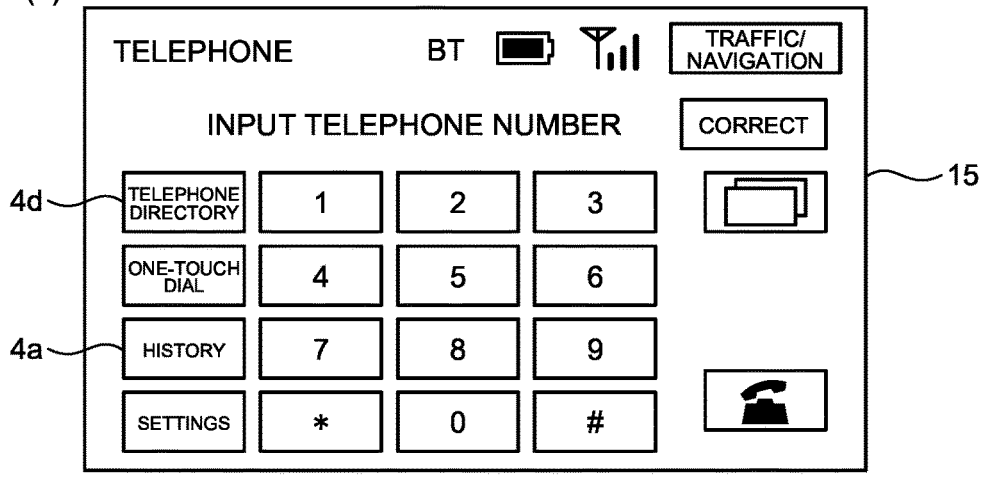
(b)
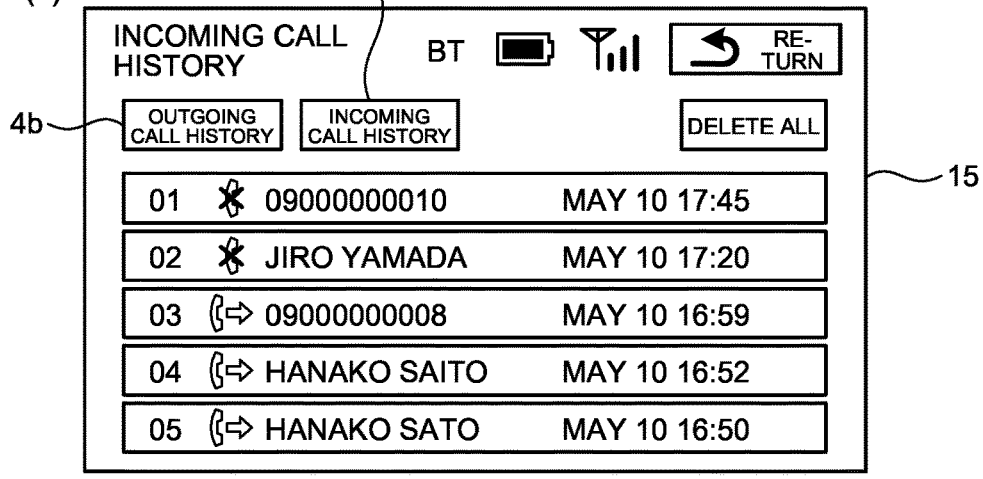
(c)
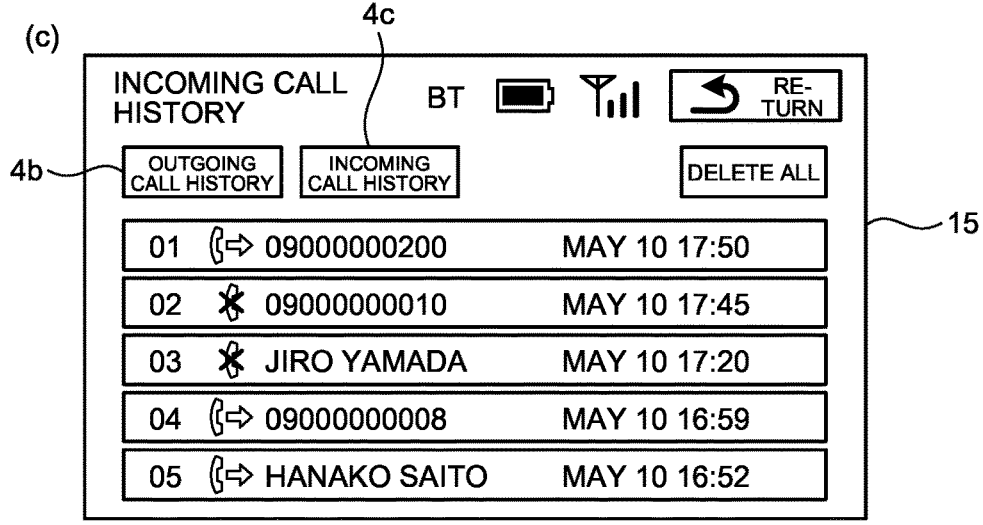

HANDS-FREE DEVICE, DATA TRANSFER METHOD, AND COMPUTER PROGRAM PRODUCT

CROSS-REFERENCE TO RELATED APPLICATIONS

This application is based upon and claims the benefit of priority from Japanese Patent Application No. 2020-045019, filed on Mar. 16, 2020, the entire contents of which are incorporated herein by reference.

FIELD

Embodiments described herein relate generally to a hands-free device, a data transfer method, and a computer program product.

BACKGROUND

There has conventionally been known a hands-free device that can establish a communication line with a cellular phone to receive an incoming call and to make an outgoing call even if a user does not directly operate the cellular phone. Such a hands-free device is installed in a vehicle, for example, and is used when the user holds a telephone conversation during driving.

In addition, there are known technologies that transfer telephone directory data and outgoing/incoming call history data from the cellular phone to the hands-free device. Conventional technologies are described in Japanese Patent Application Laid-open No. 2002-193046, for example.

However, in the conventional technologies, when the cellular phone receives a voice message or registration of an answerphone record to an answerphone service, the user may not be able to reproduce the voice massage or check the contents of the answerphone record from the hands-free device.

The present disclosure provides a hands-free device, a data transfer method, and a computer program product, which enable a user to reproduce a voice message or check the contents of an answerphone record when the hands-free device and a cellular phone perform communication connection pursuant to HFP and PBAP.

SUMMARY

A hands-free device according to an embodiment of the present disclosure includes a memory and a processor coupled to the memory. The processor is configured to: connect to a cellular phone in a hands-free telephone conversation-enabled manner pursuant to Hands-Free Profile (HFP); receive from the cellular phone at least one of outgoing call history data, incoming call history data, unattended incoming call history data, and telephone directory data stored in the cellular phone by a communication protocol pursuant to Phone Book Access Profile (PBAP); and receive, when the cellular phone receives a voice message or an answerphone record, at least one of information on the voice message and information on the answerphone record from the cellular phone.

BRIEF DESCRIPTION OF THE DRAWINGS

FIGS. 11A to 11C are diagrams of an exemplary correspondence relation between outgoing call history data and telephone directory data according to the first embodiment;

FIGS. 12A to 12C are diagrams of an exemplary correspondence relation between incoming call history data and the telephone directory data according to the first embodiment;

FIGS. 13A to 13C are diagrams of an exemplary correspondence relation between unattended incoming call history data and the telephone directory data according to the first embodiment;

FIG. 14 is a diagram of exemplary outgoing call history data, incoming call history data, unattended incoming call history data, and all history data according to the first embodiment;

FIG. 17 is a diagram of exemplary outgoing call history data according to the first embodiment;

FIG. 18 is a diagram of exemplary incoming call history data according to the first embodiment;

FIG. 19 is a diagram of an exemplary transition of display screens when the user performs an outgoing call operation from an outgoing call history according to the first embodiment;

FIG. 20 is a diagram of an exemplary transition of display screens when the user performs an outgoing call operation from an incoming call history according to the first embodiment;

FIG. 21 is a diagram of an exemplary transition of display screens when the user performs an outgoing call operation from a telephone directory according to the first embodiment;

FIG. 22 is a diagram of exemplary telephone directory data according to the first embodiment;

FIG. 24 is a diagram of another exemplary transition of display screens when the user performs an outgoing call operation from the incoming call history according to the first embodiment;

DETAILED DESCRIPTION

The following describes embodiments of a hands-free device, a data transfer method, and a computer program product according to the present disclosure with reference to the accompanying drawings.

First Embodiment

Figure 1:
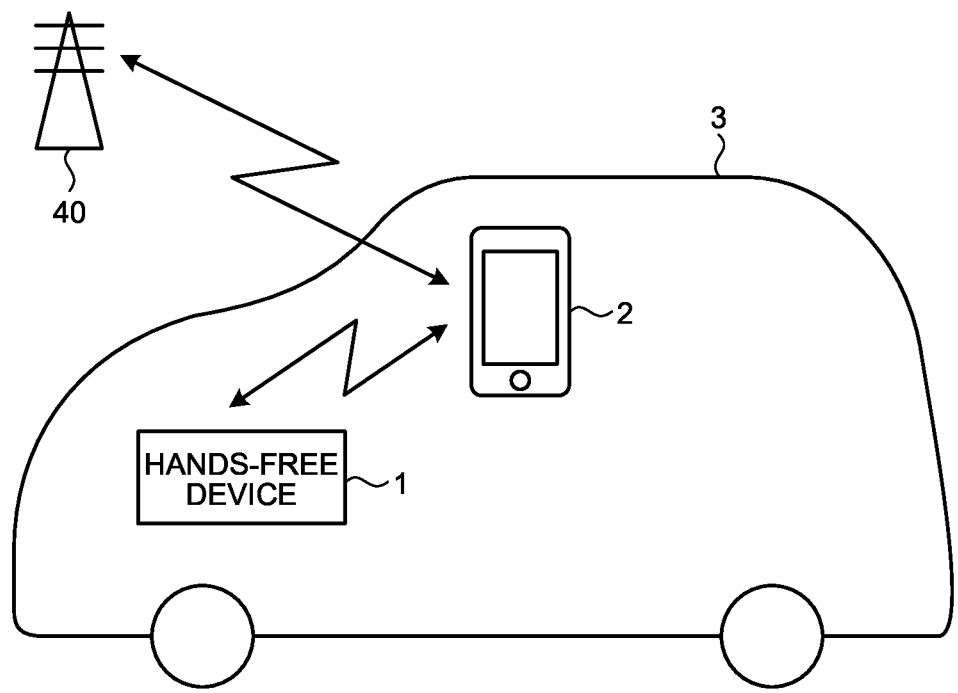
FIG. 1 is a diagram of an exemplary use mode of a hands-free device according to a first embodiment.

FIG. 1 is a diagram of an exemplary use mode of a hands-free device 1 according to the present embodiment. As illustrated in FIG. 1, the hands-free device 1 of the present embodiment can be installed in a vehicle 3. The hands-free device 1 is communicably connected with a cellular phone 2. The cellular phone 2 wirelessly communicates with a base station 40 via a cellular phone network. The cellular phone 2 is a smartphone, for example, and has a communication function based on the Bluetooth (registered trademark) system as near-field wireless communication means. The cellular phone 2 may be a cellular phone of a type other than the smartphone so long as it has a communication function based on the Bluetooth system.

The hands-free device 1 connects to the cellular phone network via the cellular phone 2. Thus, a driver of the vehicle 3, for example, can make an outgoing call and receive an incoming call by operating the hands-free device 1 even without operating the cellular phone 2. The hands-free device 1 may be implemented as one function of an on-vehicle navigation apparatus installed in the vehicle 3, for example.

Figure 2:
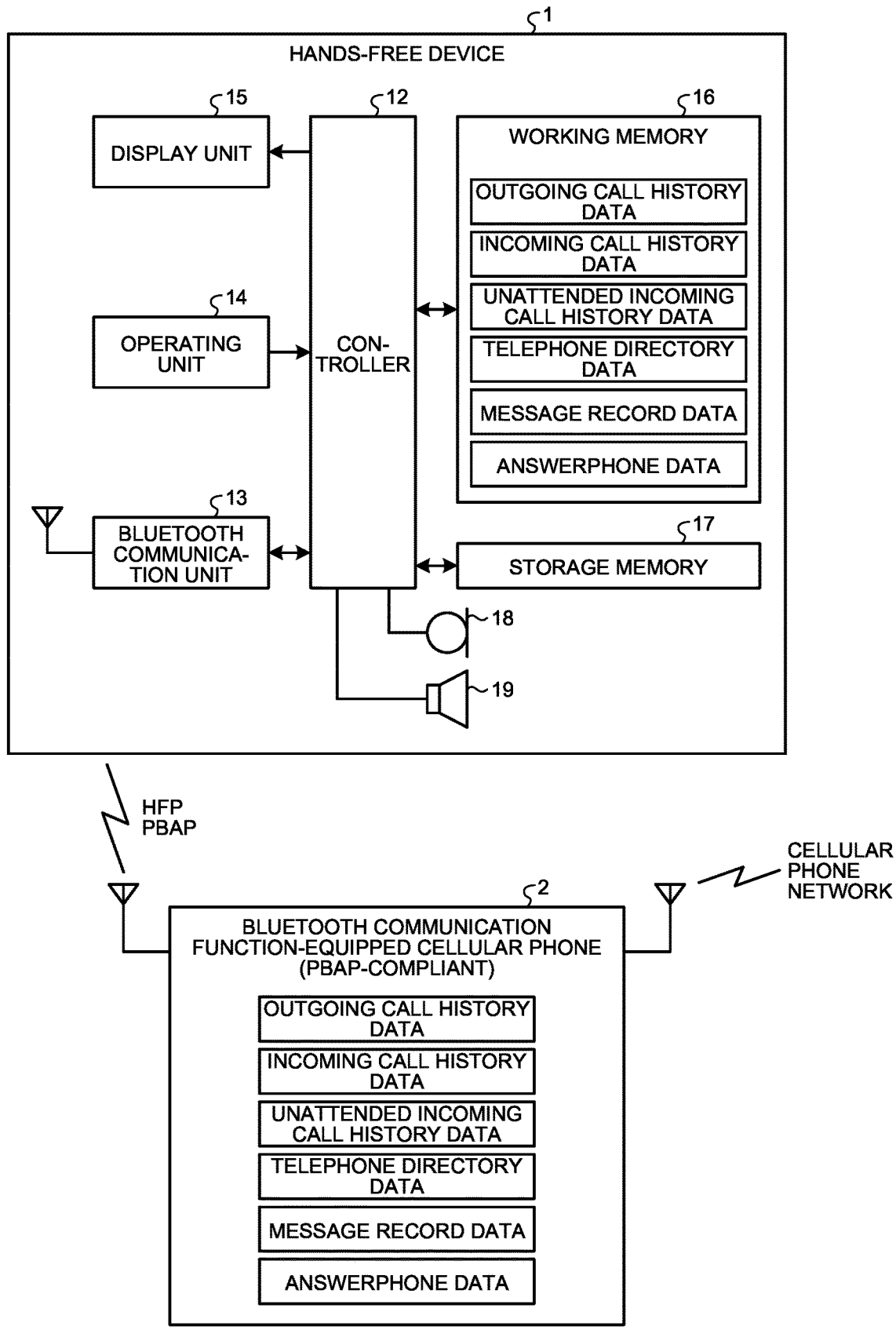
FIG. 2 is a diagram of an exemplary hardware configuration of the hands-free device according to the first embodiment.

FIG. 2 is a diagram of an exemplary hardware configuration of the hands-free device 1 according to the present embodiment. The hands-free device 1 according to the present embodiment is a hands-free function-equipped on-vehicle navigation apparatus, for example. The hands-free device 1 includes a controller 12, a Bluetooth communication unit 13, an operating unit 14, a display unit 15, a working memory 16, a storage memory 17, a microphone 18, and a speaker 19.

The controller 12 controls the entire operation such as communication operation and data management operation of the hands-free device 1. The controller 12 is a processor such as a central processing unit (CPU), for example. The controller 12 is exemplary control means, determination means, display control means, transfer protocol control means, transfer protocol disconnection means, hands-free protocol control means, initial hands-free protocol communication means, communication keeping means, telephone directory transfer setting means, data transfer designation means, and manual transfer protocol designation means.

The Bluetooth communication unit 13 is compliant to the Bluetooth system as near-field wireless communication means and establishes a wireless communication line with the cellular phone 2 present within a Bluetooth wireless communication range to perform communication pursuant to Bluetooth communication standards. In this case, it is assumed that the cellular phone 2 has a Bluetooth communication function and is present within the Bluetooth wireless communication range of the hands-free device 1.

The Bluetooth communication unit 13 in this example is compliant to known Hands Free Profile (HFP) for holding a hands-free telephone conversation and Phone Book Access Profile (PBAP) for performing transfer of telephone directory data and transfer of outgoing/incoming call history data. These profiles mean communication protocols defined for respective functions. The Bluetooth communication unit 13 is exemplary outgoing call history data reception means, incoming call history data reception means, data reception means, near-field wireless communication means, wireless communication means, hands-free telephone conversation protocol connection means, and data transfer protocol connection means.

As is known, the cellular phone 2, on its own (in a state not connecting HFP with the hands-free device 1 as a hands-free device), establishes a cellular phone line with the base station 40 of the cellular phone network and can perform outgoing call processing and incoming call processing on its own. In this case, as the outgoing call processing, when a user operates dial keys ("0" to "9" numeric keys) (not illustrated) to input a telephone number of an outgoing call destination and then operates an outgoing call key (not illustrated), for example, the cellular phone 2 can make an outgoing call with the telephone number as the outgoing call destination and hold a telephone conversation with a cellular phone of the outgoing call destination.

As the incoming call processing, upon reception of an incoming call signal from the base station 40 in accordance with the fact that a cellular phone of an outgoing call source has made an outgoing call with the cellular phone 2 as an outgoing call destination, the cellular phone 2 receives the telephone number of the cellular phone of the outgoing call source as an incoming call telephone number from the base station 40 and, when the user operates an incoming call key (not illustrated), can respond to the cellular phone of the outgoing call source and can hold a telephone conversation with the cellular phone of the outgoing call source.

The cellular phone 2 has a timepiece unit (not illustrated) measuring a date and time and stores therein, with correspondence between an outgoing telephone number input from the dial keys in the outgoing call processing described above and an outgoing call date and time based on the date and time measured by the timepiece unit as one piece of data, a plurality of pieces of outgoing call history data. The cellular phone 2 stores therein, with correspondence between an incoming call telephone number received from the base station 40 in the incoming call processing described above and an incoming call date and time based on the date and time measured by the timepiece unit as one piece of data, a plurality of pieces of incoming call history data.

The cellular phone 2 stores therein, with correspondence between an incoming call telephone number received from the base station 40 when making no response to an incoming call and an incoming call date and time based on the date and time measured by the timepiece unit as one piece of data, a plurality of pieces of unattended incoming call history data. Further, the cellular phone 2 holds, with correspondence between a telephone number and a registered name as one piece of data, a plurality of pieces of telephone directory data. The telephone directory data, to which the user inputs telephone numbers and registered names, stores about 500 telephone numbers and registered names, for example, in association with each other in a non-volatile memory (not illustrated).

When the cellular phone 2 has the telephone directory data, the outgoing call history data and the incoming call history data include the registered names. Specifically, the incoming call telephone number received from the base station 40 is a telephone number registered in the telephone directory data, and the cellular phone 2 checks whether a registered name is registered for this telephone number in the telephone directory data; if it is present, the incoming call history data includes the telephone number, the incoming date and time, and the registered name. The unattended incoming call history data also includes the telephone number, the incoming date and time, and the registered name through similar processing. Also for the outgoing call history data, the cellular phone 2 checks whether the telephone number with which the outgoing call has been made in the outgoing call processing is a telephone number registered in the telephone directory data. When the telephone number is registered in the telephone directory data, the outgoing call history data includes the outgoing call date and time, the outgoing call telephone number, and the registered name.

The user reads the telephone directory data to select one telephone number and makes an outgoing call and can thereby make an outgoing call by a simple operation without errors even without having to input all numeric keys corresponding to the numbers forming the telephone number one by one. The cellular phone 2 can store therein the latest 20 pieces each of the outgoing call history data, the incoming call history data, and the unattended incoming call history data, for example, and automatically deletes the oldest data each time the outgoing call processing, the incoming call processing, or unattended incoming call is performed to update the outgoing call history data, the incoming call history data, and the unattended incoming call history data. The cellular phone 2 is compliant to known HFP for holding a hands-free telephone conversation and PBAP for performing transfer of the telephone directory data and transfer of the outgoing/incoming call history data.

The cellular phone 2, when being compliant to PBAP prescribing automatic transfer of the outgoing/incoming call history data, connects PBAP immediately after the communication line is established with the Bluetooth communication unit 13, automatically transfer the telephone directory data stored at the point in time, and further automatically transfer the outgoing call history data, the incoming call history data, and the unattended incoming call history data stored at the point in time. Thus, when the cellular phone is present within the Bluetooth communication range of the hands-free device 1, the cellular phone 2 automatically transfers a maximum of 20 pieces of outgoing call history data stored by performing the outgoing call processing in the past on its own, a maximum of 20 pieces of incoming call history data stored by performing the incoming call processing in the past on its own, and a maximum of 20 pieces of unattended incoming call history data stored by performing unattended incoming call processing in the past on its own to the hands-free device 1.

In the present embodiment, when the outgoing call history data, the incoming call history data, and the unattended incoming call history data are collectively referred to, they are referred to simply as history data.

When making no response to an incoming call, the cellular phone 2 stores a voice message left by an outgoing caller in the non-volatile memory (not illustrated). The voice message is also called a message record, for example, the contents of which can be reproduced and listened to by the user of the cellular phone 2.

The message record data illustrated in FIG. 2 is an exemplary voice message stored in the cellular phone 2 of the present embodiment. The message record data includes a telephone number of an outgoing call source of a message record received by the cellular phone 2, voice data of the message record, the duration of the voice data, and a time at which the message record was registered in the cellular phone 2, for example.

The cellular phone 2, when making no response to an incoming call, acquires notification representing that the outgoing caller has left an answerphone message in an answerphone service. The answerphone service is a service provided by a cellular phone company, for example. In the present embodiment, a voice message stored by the answerphone service is referred to as the answerphone message. The answerphone message is voice data but is not stored in the main body of the cellular phone 2 unlike the message record described above; a server or the like of the cellular phone company stores therein the voice message of the outgoing caller.

The main body of the cellular phone 2 stores therein answerphone data as information indicating the presence of an answerphone record. The answerphone data includes a telephone number of an outgoing call source of an answerphone record received by the cellular phone 2 and a time at which the answerphone message related to each answerphone record was registered in the answerphone service, for example. The answerphone data is exemplary information on the answerphone record in the present embodiment.

When radio waves emitted from the base station 40 have reached the cellular phone 2, and when the user of the cellular phone 2 does not respond to the incoming call, for example, the voice message as the message record is stored in the cellular phone 2. When the cellular phone 2 is in a location where the radio waves do not reach, or when the power of the cellular phone 2 is off, the outgoing caller can store the answerphone message in the answerphone service.

The standard about how the message record and the answerphone message are separately used is not limited thereto.

The operating unit 14 of the hands-free device 1 is an operating means referred to in the present embodiment for the user to operate, includes touch keys formed in the display unit 15, for example, detects an operation by the user, and outputs an operating signal representing its operation details to the controller 12. The display unit 15 is a display means referred to in the present embodiment, and upon input of a display signal from the controller 12, displays a display screen based on the input display signal, and displays a display screen on which dial keys corresponding to "0" to "9" are arranged as a display screen for the user to input a telephone number, for example. The display unit 15 is a liquid crystal display or an electro luminescence (EL) display, for example, but is not limited thereto.

The working memory 16 is an outgoing call history data storage means, an incoming call history data storage means, and a data storage means referred to in the present embodiment and includes a volatile memory. The working memory 16 stores therein the outgoing call history data, the incoming call history data, the unattended incoming call history data, and the telephone directory data automatically transferred from the cellular phone 2 without involving any user operation. In this case, the working memory 16 can store therein five pieces each of the outgoing call history data, the incoming call history data, and the unattended incoming call history data, for example. The working memory 16 is a random access memory (RAM), for example.

The storage memory 17 includes a non-volatile memory and stores therein various kinds of data. The storage memory 17 is a read only memory (ROM), for example. The storage memory 17 may be a writable storage medium such as a hard disk drive (HDD) or a flash memory.

In this case, the controller 12 causes the display unit 15 to display the outgoing call history data stored in the working memory 16 when the user makes a request to display the outgoing call history data with the operating unit 14, causes the display unit 15 to display the incoming call history data stored in the working memory 16 when the user makes a request to display the incoming call history data with operating unit 14, and causes the display unit 15 to display the telephone directory data stored in the working memory 16 when the user makes a request to display the telephone directory data with the operating unit 14. As described above, the hands-free device 1 of the present embodiment has five pieces each of the outgoing call history data and the incoming call history data stored in the working memory 16 and has five pieces each of them at the maximum displayed on the display unit 15. The number of these pieces of data stored in the working memory 16 is by way of example, and the above example is not limited thereto.

The microphone 18 is a voice input means inputting voices and receives input of voices emitted by the user when holding a hands-free telephone conversation using the cellular phone 2. The speaker 19 is a voice output means and outputs received voices of a telephone conversation counterpart when holding a hands-free telephone conversation using the cellular phone 2. That is to say, when a Bluetooth communication line is established between the Bluetooth communication unit 13 and the cellular phone 2 to connect HFP-based wireless communication, the controller 12 transmits the voices input by the microphone 18 from the Bluetooth communication unit 13 to the cellular phone 2 to transmit them from the cellular phone 2 to the cellular phone network and receives voices received from the cellular phone network by the cellular phone 2 from the cellular phone 2 to the Bluetooth communication unit 13 to output them from the speaker 19.

The hands-free device 1 described above may also include functional blocks required for navigation operation such as a global positioning system (GPS) apparatus as a current position detector detecting a current position of the vehicle, a route search unit searching for a route from the current position to a destination, a map data reading unit reading map data from a recording medium recording the map data, a VICS information reception module receiving VICS information distributed from a VICS (registered trademark) center, and a voice recognition unit voice-recognizing voices emitted by the user apart from the illustrated functional blocks. In this case, the hands-free device 1 may extract GPS date and time information from a GPS wireless signal received by the GPS apparatus from GPS satellites to acquire a date and time and use the acquired date and time as the outgoing call date and time or the incoming call date and time.

The hands-free device 1 described above is configured to start up and stop in conjunction with the on and off of an ACC switch (a switch turning on and off power supply to vehicle devices). When the ACC switch is switched from on to off in accordance with an operation by the user, for example, power supply to the hands-free device 1 is stopped, and consequently, its apparatus power supply shifts from on to off. In this case, although the various kinds of data stored in the storage memory 17 immediately therebefore is not deleted (is stored), the outgoing call history data, the incoming call history data, the unattended incoming call history data, and the telephone directly data stored in the working memory 16 immediately therebefore are deleted.

Figure 3:
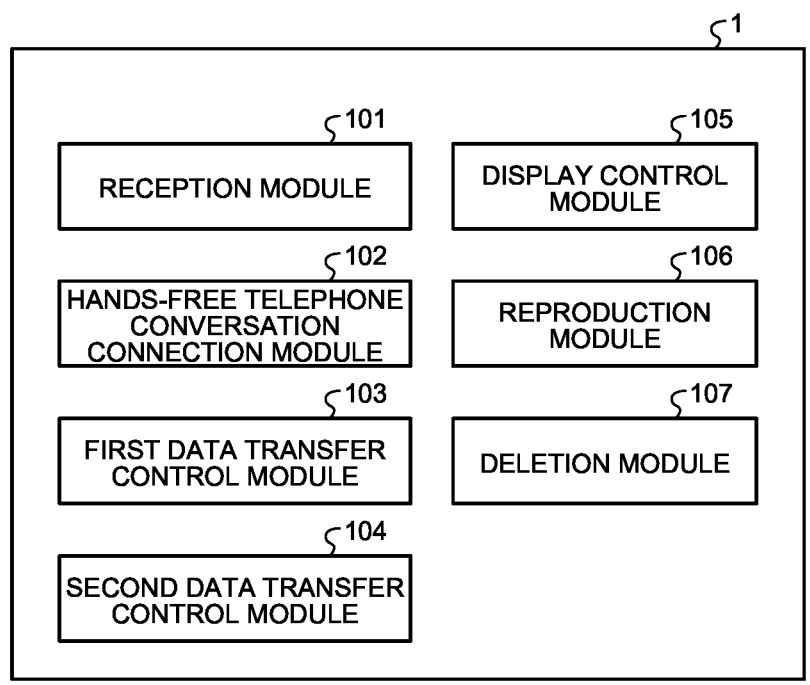
FIG. 3 is a diagram of exemplary functions included in the hands-free device according to the first embodiment.

The following describes details of the functions of the hands-free device 1 of the present embodiment. FIG. 3 is a diagram of exemplary functions included in the hands-free device 1 according to the present embodiment. As illustrated in FIG. 3, the hands-free device 1 of the present embodiment includes a reception module 101, a hands-free telephone conversation connection module 102, a first data transfer control module 103, a second data transfer control module 104, a display control module 105, a reproduction module 106, and a deletion module 107.

The reception module 101, the hands-free telephone conversation connection module 102, the first data transfer control module 103, the second data transfer control module 104, the display control module 105, the reproduction module 106, and the deletion module 107 are implemented by reading a computer program from the storage memory 17 and executing it by the controller 12. The functions illustrated in FIG. 3 are by way of example; the controller 12 of the hands-free device 1 may further implement other functions.

The reception module 101 receives various kinds of operations from the user. When the user operates the operating unit 14, for example, the reception module 101 receives the operation by the user via the operating unit 14. More specifically, the reception module 101, when an operation to press any of various kinds of icon images or pop-up display displayed on the display unit 15 is done, receives an operation corresponding to the icon image or the pop-up display pressed by the user. The various kinds of icon images or pop-up display displayed on the display unit 15 will be described below.

When the user presses an icon image representing the voice message, for example, the reception module 101 receives an operation to reproduce the voice message. When receiving the operation, the reception module 101 notifies the reproduction module 106 of the fact that the operation has been received.

When the user presses an icon image or pop-up display representing the answerphone record, for example, the reception module 101 receives an operation to reproduce the answerphone record. When receiving the operation, the reception module 101 notifies hands-free telephone conversation connection module 102 of the fact that the operation has been received.

The reception module 101 receives an operation to delete the message record from the user. When receiving the operation to delete the message record, the reception module 101 notifies the deletion module 107 of the fact that the operation has been received.

The hands-free telephone conversation connection module 102 connects to the cellular phone 2 in a hands-free telephone conversation-enabled manner pursuant to HFP. More specifically, the hands-free telephone conversation connection module 102 controls the Bluetooth communication unit 13 to connect to the cellular phone 2 in a hands-free telephone conversation-enabled manner.

The first data transfer control module 103 receives at least one of the outgoing call history data, the incoming call history data, the unattended incoming call history data, and the telephone directory data stored in the cellular phone 2 from the cellular phone 2 by a communication protocol pursuant to PBAP. In the present embodiment, the first data transfer control module 103 receives all the outgoing call history data, the incoming call history data, the unattended incoming call history data, and the telephone directory data from the cellular phone 2.

The first data transfer control module 103 stores the outgoing call history data, the incoming call history data, the unattended incoming call history data, and the telephone directory data received from the cellular phone 2 in the working memory 16. When the storage memory 17 is a writable storage medium such as an HDD or a flash memory, the first data transfer control module 103 may store the outgoing call history data, the incoming call history data, the unattended incoming call history data, and the telephone directory data received from the cellular phone 2 in the storage memory 17.

When the cellular phone 2 receives the message record or the answerphone record, the second data transfer control module 104 receives at least one of information on the message record and information on the answerphone record from the cellular phone 2. The second data transfer control module 104 controls the Bluetooth communication unit 13 to receive the message record data stored in the cellular phone 2, for example. The second data transfer control module 104 controls the Bluetooth communication unit 13 to receive the answerphone data from the cellular phone 2.

The second data transfer control module 104 stores the message record data or the answerphone data received from the cellular phone 2 in the working memory 16. When the storage memory 17 is a writable storage medium such as an HDD or a flash memory, the second data transfer control module 104 may store the message record data or the answerphone data received from the cellular phone 2 in the storage memory 17.

The display control module 105 causes the display unit 15 to display various kinds of screens. When the second data transfer control module 104 receives the information on the message record or the answerphone record from the cellular phone 2, for example, the display control module 105 causes the display unit 15 to display notification of the message record or the answerphone record.

The display control module 105 displays an icon providing notification of the voice message on the display unit 15, for example. In the present embodiment, the display control module 105 displays a pop-up image providing notification of the presence of the answerphone record on the display unit 15.

Figure 4:
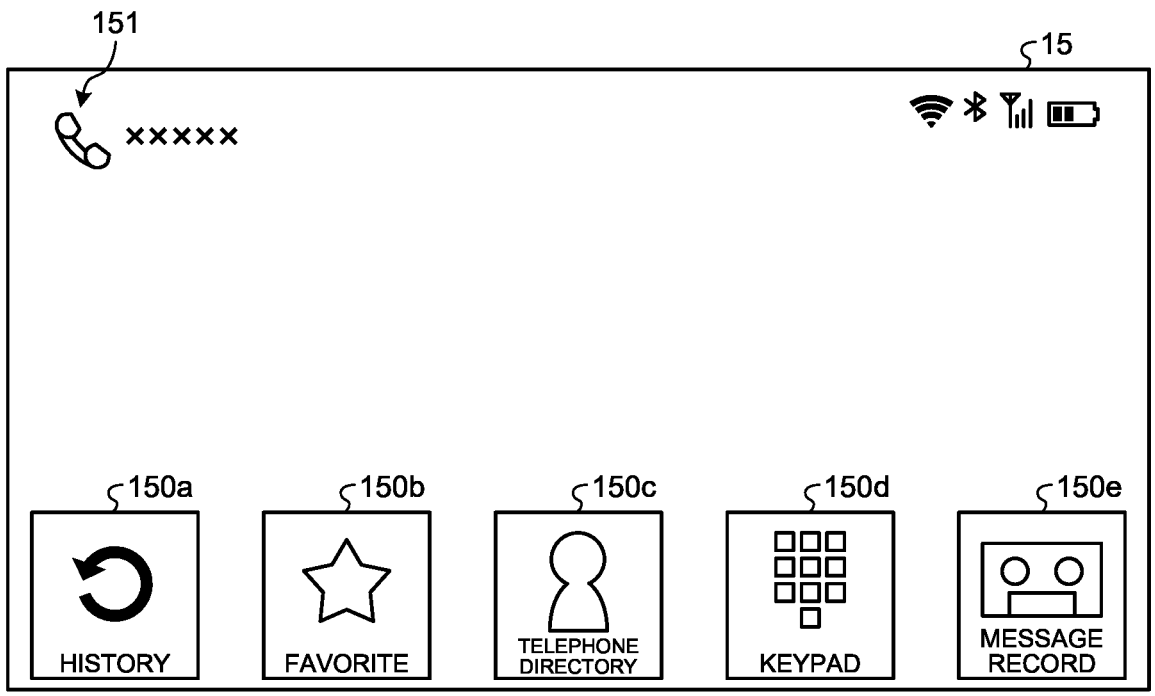
FIG. 4 is a diagram of an exemplary display screen of the hands-free device according to the first embodiment.

FIG. 4 is a diagram of an exemplary display screen of the hands-free device 1 according to the present embodiment. As illustrated in FIG. 4, the display control module 105 displays icons 150a to 150e on the display unit 15. In the following, when the icons 150a to 150e are collectively referred to, they are referred to simply as an icon 150.

In the example illustrated in FIG. 4, the user is making an outgoing call from the hands-free device 1. Thus, the display control module 105 displays an image 151 indicating making an outgoing call and a telephone number of an outgoing call destination on the display unit 15. When the telephone directory data transferred from the cellular phone 2 includes the telephone number of the outgoing call destination, the display control module 105 may display the registered name associated with the telephone number in the telephone directory data on the display unit 15.

When the user presses the icon 150e representing voice messages such as the message record illustrated in FIG. 4, for example, the display control module 105 displays a list of the message records transferred from the cellular phone 2 on the display unit 15.

Figure 5:
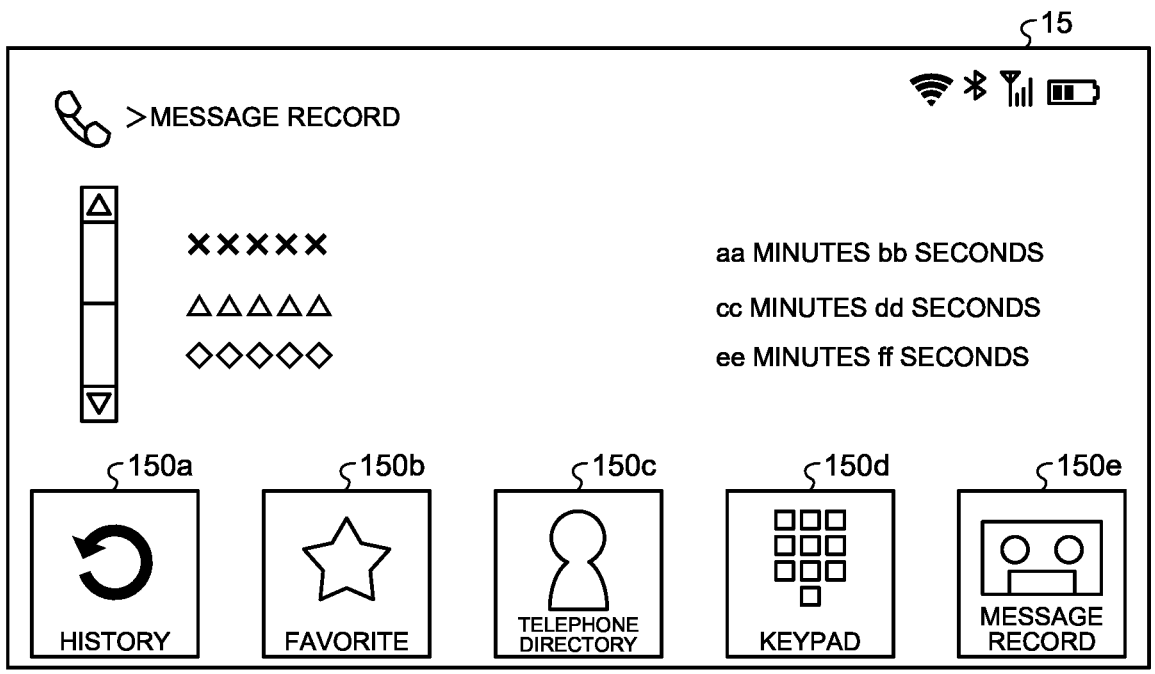
FIG. 5 is a diagram of exemplary list display of message records according to the first embodiment.

FIG. 5 is a diagram of exemplary list display of the message records according to the present embodiment. The display control module 105 displays the telephone numbers of the outgoing call sources of the message records stored in the hands-free device 1 and the recording times of the message records in association with each other on the display unit 15.

In the example illustrated in FIG. 5, three message records have been transferred from the cellular phone 2 to the hands-free device 1, but the number of the message records is not limited thereto. As an example, it is assumed that the hands-free device 1 of the present embodiment can store therein up to 20 message records. When the number of the message records transferred from the cellular phone 2 exceeds a certain number, a message record with an older registered time is deleted by the deletion module 107 described below. In the present embodiment, the certain number is 20, but is not limited thereto.

When the telephone directory data transferred from the cellular phone 2 includes the telephone number of the outgoing call destination, the display control module 105 may display the registered name associated with the telephone number in the telephone directory data on the display unit 15.

When the user presses any of the telephone numbers or the registered names of the outgoing call sources of the message records included in the list of the message records illustrated in FIG. 5, the reception module 101 receives an operation to reproduce the message record. In this case, the reproduction module 106 described below identifies the voice data of the message record corresponding to the telephone number or the registered name pressed by the user out of the message record data stored in the working memory 16 or the storage memory 17 and reproduces the voice data.

Figure 6:
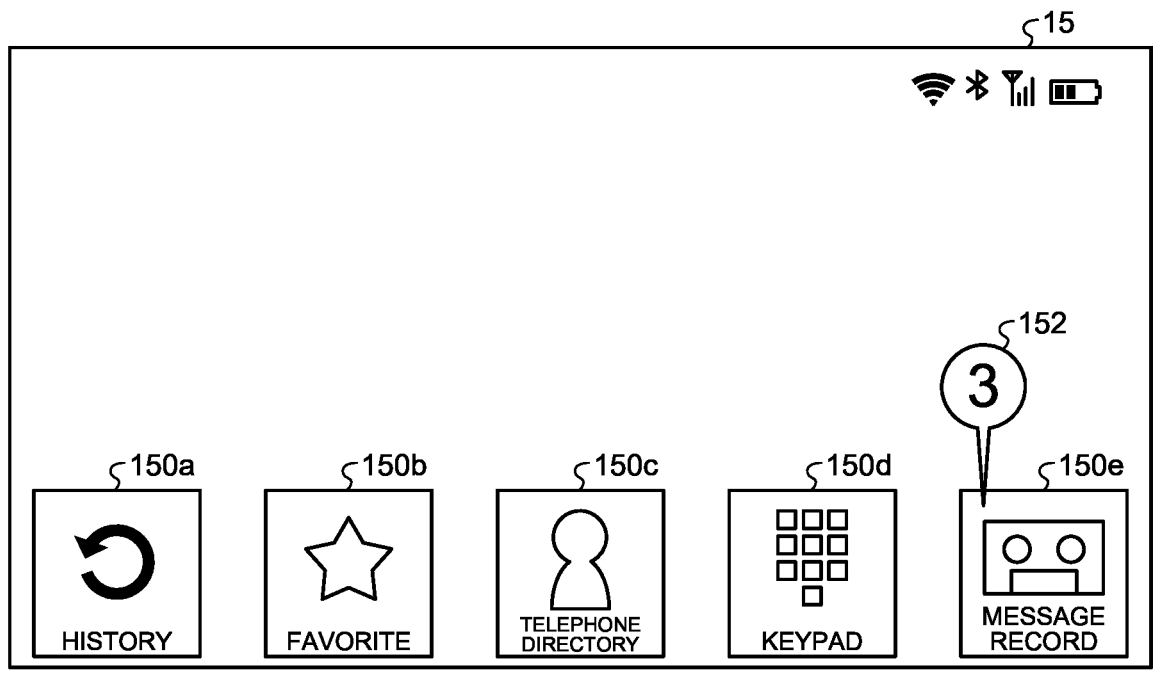
FIG. 6 is a diagram of an exemplary display screen providing notification of message records according to the first embodiment.

FIG. 6 is a diagram of an exemplary display screen providing notification of the message record according to the present embodiment. As illustrated in FIG. 6, when receiving the voice message such as the message record from the cellular phone 2, for example, the display control module 105 may display an image representing the number of the received message records on the display unit 15.

A number notification image 152 illustrated in FIG. 6 is an image representing the number of the message records transferred from the cellular phone 2 to the hands-free device 1. FIG. 6 illustrates that three message records have been transferred from the cellular phone 2 to the hands-free device 1. The display control module 105 acquires the number of the message records from the message record data stored in the hands-free device 1 and displays the number as the number notification image 152. The number notification image 152 may represent the number of all the message records stored in the hands-free device 1 or represent the number of message records that have not yet been reproduced by the user out of the message records stored in the hands-free device 1.

The display control module 105 displays the number notification image 152 near the icon 150e representing the voice message such as the message record to notify the user of the presence of the message records.

The method of notification of the message records is not limited to the example illustrated in FIG. 6. When the hands-free device 1 stores therein any message records that have not yet been reproduced by the user, for example, the display control module 105 may make the icon 150e blink or change the color of the icon 150e. The display control module 105 does not necessarily cause the display unit 15 to display the icon 150e when the hands-free device 1 has not stored therein any message record data and may cause the display unit 15 to display the icon 150e only when the hands-free device 1 stores therein message record data.

Figure 7:
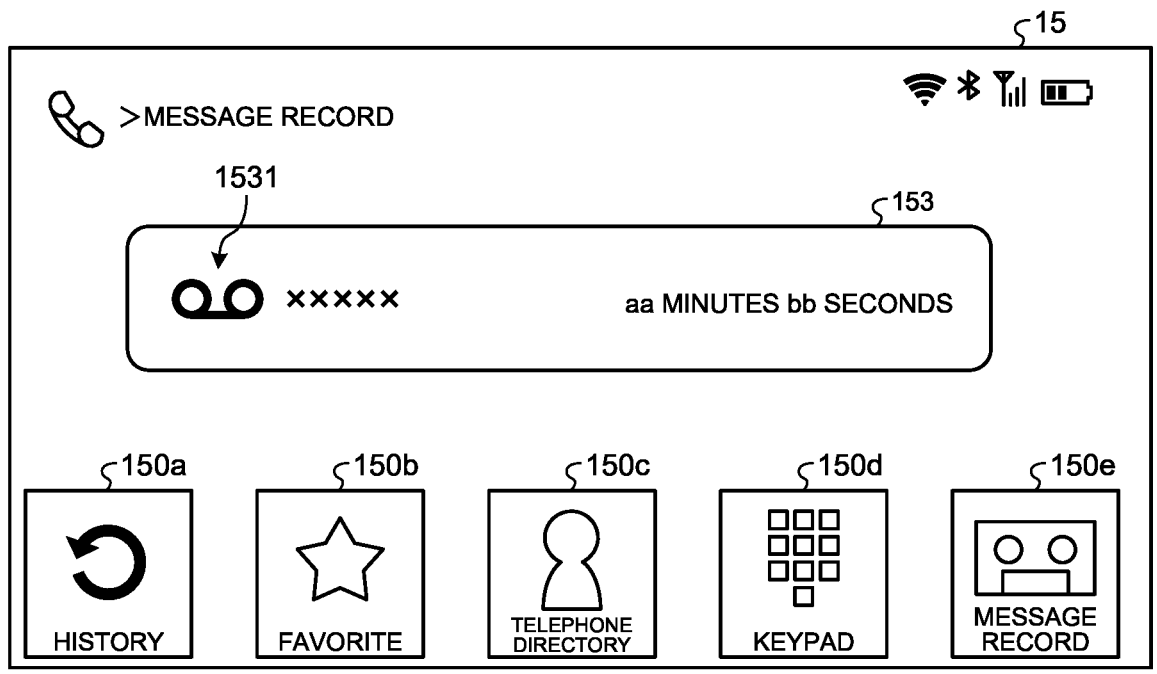
FIG. 7 is a diagram of an exemplary display screen providing notification of an answerphone record according to the first embodiment.

FIG. 7 is a diagram of an exemplary display screen providing notification of an answerphone record according to the present embodiment. As illustrated in FIG. 7, when the second data transfer control module 104 receives the answerphone data from the cellular phone 2, the display control module 105 displays a pop-up image 153 providing notification of the presence of the answerphone record on the display unit 15.

The pop-up image 153 is an image displayed superimposed on a standby screen. In the example illustrated in FIG. 7, the pop-up image 153 includes an image 1531 representing the answerphone record, a telephone number of an outgoing caller who has registered an answerphone message, and the duration of the answerphone message. When the telephone directory data transferred from the cellular phone 2 includes the telephone number of the outgoing caller, the display control module 105 may display the registered name associated with the telephone number in the telephone directory data on the display unit 15. When the answerphone data includes a plurality of answerphone records, the display control module 105 causes the display unit 15 to display the pop-up image 153 for each of the answerphone records. In the present embodiment, the standby screen is a screen displayed on the display unit 15 when the hands-free device 1 enables a hands-free telephone conversation. The standby screen is a screen displaying the icons 150a to 150e as illustrated in FIG. 4, for example.

When the user presses the pop-up image 153, the reception module 101 receives an operation to reproduce the answerphone record. In this case, the hands-free telephone conversation connection module 102 controls the Bluetooth communication unit 13 to access the answerphone service via the cellular phone 2. Thus, the voice data of the answerphone message registered in the answerphone service is reproduced form the speaker 19.

Referring back to FIG. 3, when the reception module 101 receives the operation to reproduce the voice message, the reproduction module 106 reproduces the voice message. When the user presses any of the telephone numbers or the registered names of the outgoing call sources of the message records included in the list of the message records displayed on the display unit 15, for example, the reproduction module 106 identifies the voice data of the message record corresponding to the telephone number or the registered name pressed by the user out of the message record data stored in the working memory 16 or the storage memory 17 and reproduces the voice data from the speaker 19.

The deletion module 107 deletes the message record data stored in the working memory 16 or the storage memory 17. When the number of the message records transferred from the cellular phone 2 and stored in the working memory 16 or the storage memory 17 exceeds a certain number, for example, the deletion module 107 deletes a message record with an older registered time. When the reception module 101 receives a message record deletion operation by the user, the deletion module 107 deletes a message record designated by the user. The message record deletion operation by the user may be able to designate an object to be deleted for each message record or delete all message records stored in the working memory 16 or the storage memory 17.

The following describes an action of the configuration described above. The present embodiment will be described on the assumption that with the cellular phone 2 already holding (storing therein) 20 pieces of outgoing call history data as a maximum storable number, 20 pieces of incoming call history data as a maximum storable number, and 20 pieces of unattended incoming call history data as a maximum storable number, the user carrying the cellular phone 2 approaches the vehicle 3 to get in, and the ACC switch is turned on, whereby the cellular phone 2 has entered the Bluetooth communication range of the hands-free device 1.

The following first describes a procedure in which in the hands-free device 1 the controller 12 receives the outgoing call history data, the incoming call history data, the unattended incoming call history data, the telephone directory data, the message record data, and the answerphone data from the cellular phone 2. The user has registered the cellular phone 2 as a counterpart of Bluetooth communication by the hands-free device 1 in advance.

At the time of setting initial communication, the user inputs a four-digit password for each cellular phone 2 to the hands-free device 1, for example. The hands-free device 1 and the cellular phone 2 generate a link key for use in mutual connection and hold the link key. The hands-free device 1 performs authentication of the link key at the time of initial connection to select the cellular phone 2 to be communicably connected. That is to say, neither HFP-based communication connection nor PBAP-based communication connection is performed between the hands-free device 1 and a nonregistered cellular phone. Basically, the cellular phone 2 of an owner of the vehicle 3 is registered in advance, and Bluetooth communication is performed between the cellular phone 2 and the hands-free device 1. As to the advance registration of the cellular phone 2 as a communication object of the hands-free device 1, the above method is by way of example and is not limited thereto.

In the present example, it is assumed that a plurality of cellular phones 2 to be communicably connected are registered in the hands-free device 1. The user operates the operating unit 14 to set priority for the cellular phones 2 in advance, for example, and the working memory 16 or the storage memory 17 stores therein the priority. Some drivers possess the cellular phones 2, for example, and thus the cellular phones 2 can thus be registered in the hands-free device 1.

Figure 8:
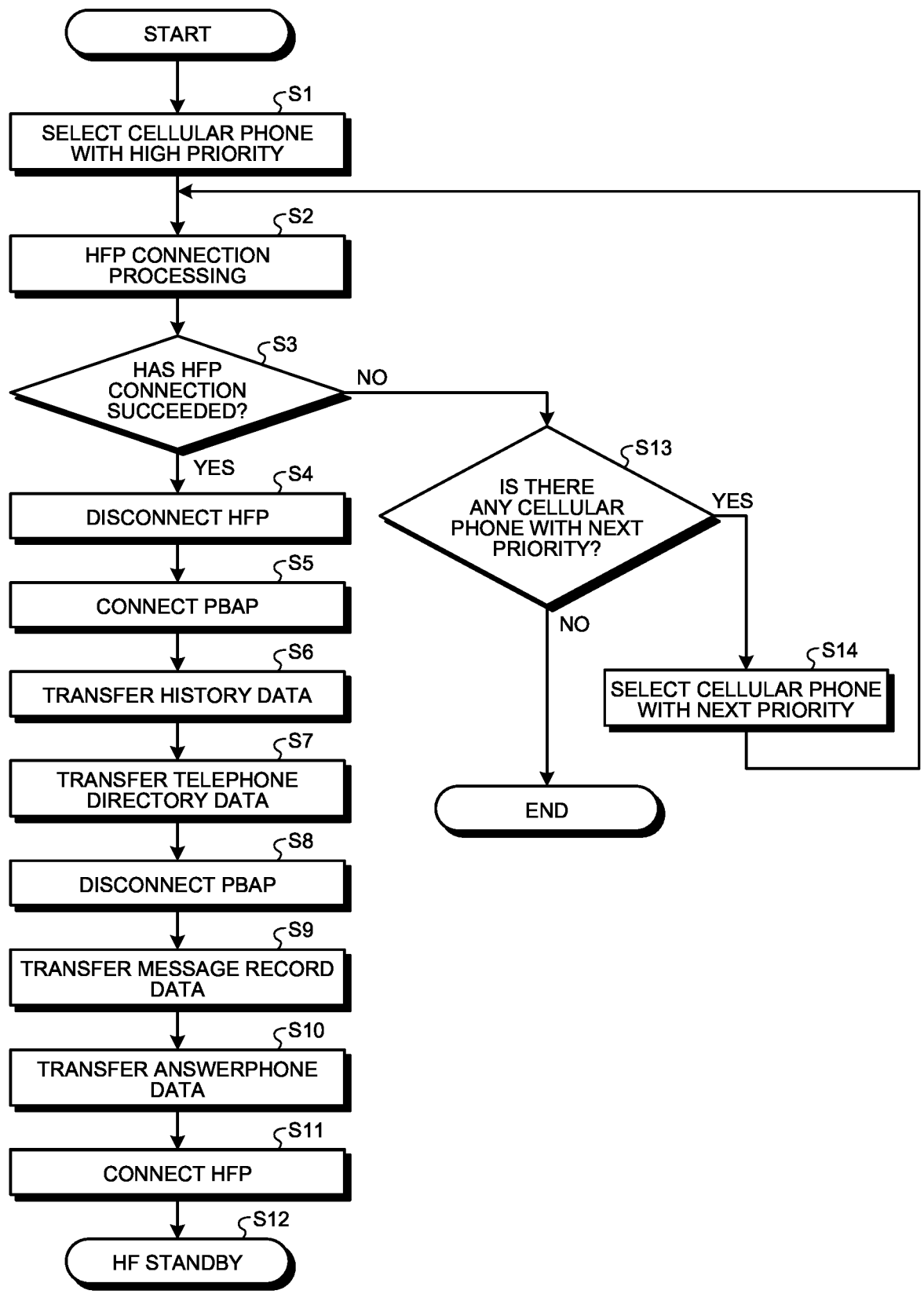
FIG. 8 is a diagram of an exemplary procedure of data transfer processing according to the first embodiment.

FIG. 8 is a diagram of an exemplary procedure of data transfer processing according to the present embodiment. More specifically, the processing of this flowchart is initial data transfer processing executed when the hands-free device 1 connects to the cellular phone 2.

First, the hands-free telephone conversation connection module 102 selects the cellular phone 2 with high priority as an object to be communicably connected in the HFP-based wireless communication (S1). In the present example, without performing the PBAP-based communication connection first, HFP-based initial communication is first automatically attempted to start connection.

Next, the hands-free telephone conversation connection module 102 executes processing to automatically connect the HFP-based initial communication for the selected cellular phone 2 (S2). The hands-free telephone conversation connection module 102 determines whether HFP-based wireless communication connection has succeeded (S3).

If the hands-free telephone conversation connection module 102 determines that the HFP-based wireless communication connection has succeeded (Yes at S3), the hands-free telephone conversation connection module 102 automatically disconnects the connected HFP-based wireless communication (S4).

The first data transfer control module 103 automatically connects PBAP-based wireless communication for the cellular phone 2 that has succeeded in the HFP-based wireless communication connection (S5).

Next, the first data transfer control module 103 transmits a history data transfer request to start processing to transfer the outgoing call history data, the incoming call history data, and the unattended incoming call history data to the cellular phone 2 (S6).

The cellular phone 2 that has received the history data transfer request transmits the outgoing call history data, the incoming call history data, and the unattended incoming call history data to the hands-free device 1 by Bluetooth communication pursuant to PBAP. The first data transfer control module 103 stores the outgoing call history data, the incoming call history data, and the unattended incoming call history data transferred from the cellular phone 2 in the working memory 16 or the storage memory 17.

Upon ending the processing to transfer the history data, the first data transfer control module 103 transmits a telephone directory data transfer request to start processing to transfer the telephone directory data to the cellular phone 2 (S7).

The cellular phone 2 that has received the telephone directory data transfer request transfers the telephone directory data to the hands-free device 1 by Bluetooth communication pursuant to PBAP. The first data transfer control module 103 stores the telephone directory data transferred from the cellular phone 2 in the working memory 16 or the storage memory 17.

Upon ending the processing to transfer the telephone directory data, the first data transfer control module 103 disconnects the PBAP-based wireless communication with the cellular phone 2 (S8).

Next, the second data transfer control module 104 transmits a message record data transfer request to start processing to transfer the message record data to the cellular phone 2 (S9).

The cellular phone 2 that has received the message record data transfer request transfers the message record data to the hands-free device 1 by Bluetooth communication. The second data transfer control module 104 stores the message record data transferred from the cellular phone 2 in the working memory 16 or the storage memory 17.

Next, the second data transfer control module 104 transmits an answerphone data transfer request to start processing to transfer the answerphone data to the cellular phone 2 (S10).

The cellular phone 2 that has received the answerphone data transfer request transfers the answerphone data to the hands-free device 1 by Bluetooth communication. The second data transfer control module 104 stores the answerphone data transferred from the cellular phone 2 in the working memory 16 or the storage memory 17.

It is assumed that the Bluetooth communication unit 13, in the processing of transfer of the message record data and transfer of the answerphone data, performs communication with the cellular phone 2 without using HFP and PBAP. The protocol used for the processing of transfer of the message record data and transfer of the answerphone data is not limited to a particular protocol.

Next, the hands-free telephone conversation connection module 102 again automatically connects the HFP-based wireless communication for the cellular phone 2 (S11).

Upon establishing the HFP-based wireless communication with the cellular phone 2, the hands-free telephone conversation connection module 102 shifts to hands-free (HF) standby processing (S12). During execution of the hands-free standby processing, the hands-free device 1 is enabled to make an outgoing call or receive an incoming call via the cellular phone 2. The hands-free standby processing continues until the power of the hands-free device 1 is turned off or the HFP-based wireless communication with the cellular phone 2 is cancelled. Examples of the case in which the HFP-based wireless communication with the cellular phone 2 is cancelled include a case in which an operation to cancel connection is performed on the hands-free device 1 or the cellular phone 2 and a case in which the cellular phone 2 has left the Bluetooth communication range of the hands-free device 1.

Thus, in the present embodiment, wireless communication is serially automatically switched in the order of HFP→PBAP→HFP. Thus, for cellular phones compliant to the HFP-based wireless communication and the PBAP-based wireless communication of many manufacturers, communication processing can be performed surely and stably. In addition, the method can reduce the complexity of software processing by the hands-free device 1.

If the hands-free telephone conversation connection module 102 determines that the HFP-based wireless communication connection has not succeeded (failed) (No at S3), the hands-free telephone conversation connection module 102 determines whether there is any cellular phone 2 with next priority (S13).

If the hands-free telephone conversation connection module 102 determines that there is any cellular phone 2 with next priority (Yes at S13), the hands-free telephone conversation connection module 102 selects the cellular phone 2 with next priority as an object to be wirelessly communicably connected (S14) and returns to S2 described above to repeatedly perform the processing described above.

If the hands-free telephone conversation connection module 102 determines that there is no cellular phone 2 with next priority (No at S13), the hands-free telephone conversation connection module 102 ends the processing of this flowchart.

In the procedure of the processing described in FIG. 8, the Bluetooth communication unit 13 of the hands-free device 1 serially connects the HFP-based wireless communication, the PBAP-based wireless communication, and the wireless communication for the processing to transfer the message record data and the answerphone data that does not use these protocols without simultaneously connecting them. The example illustrated in FIG. 8 selects connecting serially the wireless communication based on different protocols without simultaneously executing them based on the following three reasons.

(1) There is a possibility that the cellular phone 2 as a communication counterpart is compliant to the HFP-based wireless communication and the PBAP-based wireless communication but is not compliant to simultaneous connection like the hands-free device 1.

(2) Although the cellular phone 2 as the communication counterpart is compliant to the HFP-based wireless communication and the PBAP-based wireless communication and may be compliant to simultaneous connection, the software processing of the Bluetooth communication unit 13 of the hands-free device 1 is complicated in order to maintain simultaneous connection, and there is uncertainty about stability in communication connection.

(3) With the cellular phone 2 being manufactured by many manufacturers worldwide, the hands-free device 1 is required to connect to all cellular phones compliant to the HFP-based wireless communication and the PBAP-based wireless communication.

However, the connection flow is not limited thereto. The connection flow may be changed in accordance with the specifications of the hands-free device 1 and the cellular phone 2 or a connection environment, for example. The Bluetooth communication unit 13 of the hands-free device 1 may simultaneously connect with the HFP-based wireless communication and the PBAP-based wireless communication. The Bluetooth communication unit 13 may connect with the wireless communication for the processing to transfer the message record data and the answerphone data with either the HFP-based wireless communication or the PBAP-based wireless communication or both simultaneously.

When the message record or the answerphone record is registered in the cellular phone 2 after the initial data transfer processing illustrated in FIG. 8 is executed between the hands-free device 1 and the cellular phone 2, the second data transfer control module 104 acquires the message record data and the answerphone data from the cellular phone 2. In this process, the second data transfer control module 104 instructs the cellular phone 2 to transfer only the message record data and the answerphone data newly added after the previous transfer processing without again transferring the message record data and the answerphone data that have already been transferred from the cellular phone 2 to the hands-free device 1. Selection of an object to be transferred may be a function of the cellular phone 2. The second data transfer control module 104 may acquire the message record data or the answerphone data from the cellular phone 2 at a certain timing; the time of executing the initial data transfer processing and the time at which the message record or the answerphone record is registered are each exemplary certain timing. The timing of transfer of the message record data or the answerphone data is not limited thereto.

In FIG. 8, the second data transfer control module 104 executes the processing to transfer the message record data and the answerphone data after the PBAP connection; these processing may be executed before the PBAP connection. In FIG. 8, the second data transfer control module 104 executes the processing to transfer the message record data and the answerphone data; only processing to transfer either one may be executed.

Figure 9:
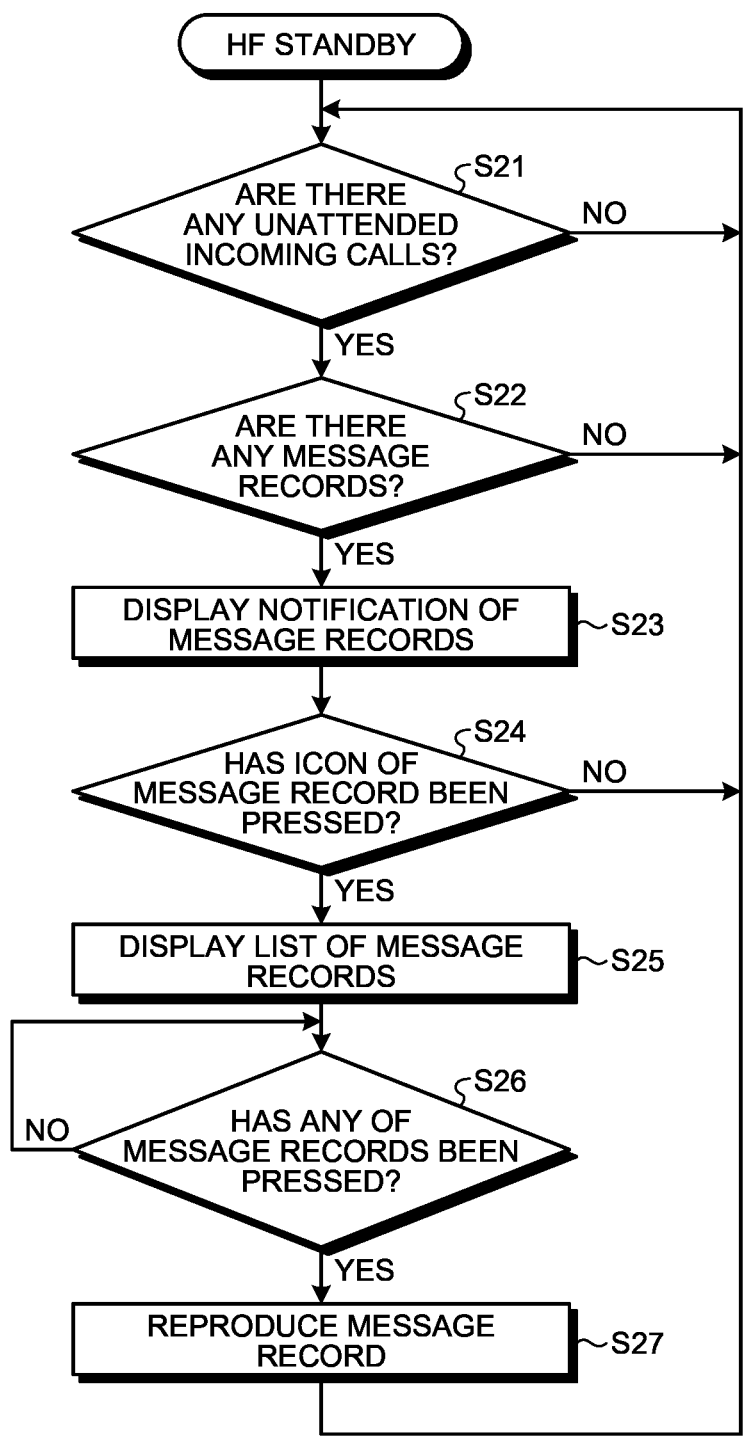
FIG. 9 is a flowchart of an exemplary procedure of processing of notification and reproduction of the message record according to the first embodiment.

The following describes a procedure of processing of notification and reproduction of the message record of the present embodiment. FIG. 9 is a flowchart of an exemplary procedure of the processing about notification and reproduction of the message record according to the present embodiment. As an assumption of the flowchart illustrated in FIG. 9, it is assumed that the data transfer processing described in FIG. 8 has been executed and the hands-free device 1 is in an HF standby state.

First, the display control module 105 of the hands-free device 1 determines the presence or absence of unattended incoming calls (S21). If the display control module 105 determines that there are no unattended incoming calls (No at S21), the display control module 105 repeats the processing at S21.

The display control module 105 determines that there are unattended incoming calls when one or more unattended incoming calls are registered in the unattended incoming call history data stored in the working memory 16 or the storage memory 17, for example (Yes at S21). In this case, the display control module 105 determines the presence or absence of message records (S22). If the display control module 105 determines that there are no message records (No at S22), the display control module 105 returns to the processing at S21.

The display control module 105 determines that there are message records when one or more message records are registered in the message record data stored in the working memory 16 or the storage memory 17, for example (Yes at S22). The display control module 105 may determine the presence or absence of message records without determining the presence or absence of unattended incoming calls.

If the display control module 105 determines that there are message records, the display control module 105 causes the display unit 15 to display notification of the message records (S23). As described in FIG. 6, for example, the display control module 105 causes the display unit 15 to display the number notification image 152 representing the number of the message records.

The reception module 101 determines whether the user has pressed the icon 150e of the message record displayed on the display unit 15 (S24). If the reception module 101 determines that the user has pressed the icon 150e (Yes at S24), the display control module 105 displays the list of the message records transferred from the cellular phone 2 on the display unit 15 as described in FIG. 5 (S25).

The reception module 101 determines whether the user has pressed any of the telephone numbers or the registered names of the outgoing call sources of the message records included in the list of the message records (S26).

If the reception module 101 determines that the user has pressed any of the telephone numbers or the registered names of the outgoing call sources of the message records included in the list of the message records (Yes at S26), the reception module 101 receives the operation to reproduce the message record. In this case, the reproduction module 106 identifies the voice data of the message record corresponding to the telephone number or the registered name pressed by the user out of the message record data stored in the working memory 16 or the storage memory 17 and reproduces the voice data (S27).

If the reception module 101 determines that the user has not pressed any of the telephone numbers or the registered names of the outgoing call sources of the message records included in the list of the message records (No at S26), the reception module 101 repeats the processing at S26.

If the reception module 101 determines that the user has not pressed the icon 150*e* (No at S24), the reception module 101 returns to the processing at S21. The processing of this flowchart is continuously executed while the cellular phone 2 is communicably connected with the hands-free device 1.

Figure 10:
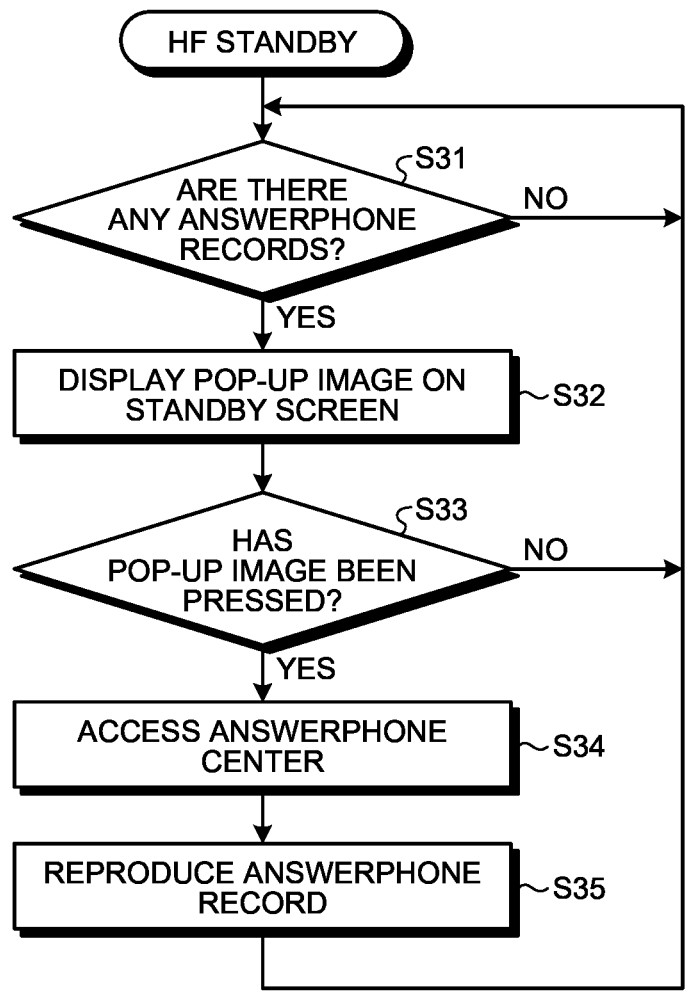
FIG. 10 is a flowchart of an exemplary procedure of processing of notification and reproduction of the answerphone record according to the first embodiment.

The following describes a procedure of processing of notification and reproduction of the answerphone record of the present embodiment. FIG. 10 is a flowchart of an exemplary procedure of processing of notification and reproduction of the answerphone record according to the present embodiment. As an assumption of the flowchart illustrated in FIG. 10, it is assumed that the data transfer processing described in FIG. 8 has been executed and the hands-free device 1 is in an HF standby state.

First, the display control module 105 of the hands-free device 1 determines the presence or absence of answerphone records (S31). If the display control module 105 determines that there are no answerphone records (No at S31), the display control module 105 repeats the processing at S31.

The display control module 105 determines that there are answerphone records when one or more answerphone records are registered in the unattended incoming call history data stored in the working memory 16 or the storage memory 17, for example (Yes at S31). In this case, the display control module 105 causes the display unit 15 to display the pop-up image 153 providing notification of the presence of the answerphone records on the standby screen thereof in a manner of superimposing the pop-up image on the standby screen as illustrated in FIG. 7 (S32).

The reception module 101 determines whether the user has pressed the pop-up image 153 (S33). If the reception module 101 determines that the user has not pressed the pop-up image 153 (No at S33), the process returns to the processing at S31.

When the user does not press the pop-up image 153 and a certain time has elapsed after the start of display, the display control module 105 may end display of the pop-up image 153 or continue display until the user operates the pop-up image 153. When a new answerphone record is transferred from the cellular phone 2 with display continued, the display control module 105 may further display the pop-up image 153 of the new answerphone record on the display unit 15 in addition to the pop-up image 153 being displayed.

If the reception module 101 determines that the user has pressed the pop-up image 153 (Yes at S33), the hands-free telephone conversation connection module 102 controls the Bluetooth communication unit 13 to access the answerphone service via the cellular phone 2 (S34). Thus, the voice data of the answerphone message registered in the answerphone service is reproduced from the speaker 19 (S35). After reproduction of the answerphone record, the process returns to the processing at S31. The processing of this flowchart is continuously executed while the cellular phone 2 is communicably connected with the hands-free device 1.

The following describes the processing to transfer the outgoing call history data, the incoming call history data, and the unattended incoming call history data described in FIG. 8 and the like more specifically.

FIGS. 11A to 11C are diagrams of an exemplary correspondence relation between the outgoing call history data and the telephone directory data according to the present embodiment. More specifically, FIG. 11A is exemplary outgoing call history data stored in the cellular phone 2. FIG. 11B is exemplary telephone directory data stored in the cellular phone 2. FIG. 11C is exemplary outgoing call history data stored in or displayed by the hands-free device 1.

FIGS. 12A to 12C are diagrams of an exemplary correspondence relation between the incoming call history data and the telephone directory data according to the present embodiment. More specifically, FIG. 12A is exemplary incoming call history data stored in the cellular phone 2. FIG. 12B is exemplary telephone directory data stored in the cellular phone 2. FIG. 12C is exemplary incoming call history data stored in or displayed by the hands-free device 1.

FIGS. 13A to 13C are diagrams of an exemplary correspondence relation between the unattended incoming call history data and the telephone directory data according to the present embodiment. More specifically, FIG. 13A is exemplary unattended incoming call history data stored in the cellular phone 2. FIG. 13B is exemplary telephone directory data stored in the cellular phone 2. FIG. 13C is exemplary unattended call history data stored in or displayed by the hands-free device 1.

The first data transfer control module 103 receives the outgoing call history data including registered names, outgoing call telephone numbers, and outgoing call dates and times illustrated in FIG. 11A from the cellular phone 2 and causes the working memory 16 or the storage memory 17 to store these therein.

The first data transfer control module 103 receives the incoming call history data including registered names, incoming call telephone numbers, and incoming call dates and times illustrated in FIG. 12A from the cellular phone 2 and causes the working memory 16 or the storage memory 17 to store these therein.

The first data transfer control module 103 receives the unattended incoming call history data including registered names, unattended incoming call telephone numbers, and unattended incoming call dates and times illustrated in FIG. 13A from the cellular phone 2 and causes the working memory 16 or the storage memory 17 to store these therein.

When the incoming call history data, the outgoing call history data, and the unattended incoming call history data do not include the registered names in the cellular phone 2, the first data transfer control module 103 may associate the telephone numbers included in the incoming call history data, the outgoing call history data, and the unattended incoming call history data and the registered names associated with the telephone numbers in the telephone directory data with each other to add the registered names to the incoming call history data, the outgoing call history data, and the unattended incoming call history data and to cause the working memory 16 or the storage memory 17 to store these therein. Upon the occurrence of a request to display the outgoing call history data, the incoming call history data, and the unattended incoming call history data, the display control module 105 causes the display unit 15 to display the outgoing call history data, the incoming call history data, and the unattended incoming call history data stored in the working memory 16 or the storage memory 17. That is to say, the display control module 105 can cause the display unit 15 to display the registered names transferred from the cellular phone 2 without reading the registered names from the telephone directory data stored in the working memory 16 or the storage memory 17.

The incoming call history data, the outgoing call history data, and the unattended incoming call history data may be stored in the working memory 16 or the storage memory 17 without the registered names included. In this case, the display control module 105 displays the telephone numbers included in the incoming call history data, the outgoing call history data, and the unattended incoming call history data and the registered names associated with the telephone numbers in the telephone directory data in association with each other on the display unit 15.

Upon completing the HFP connection processing described at S11 in FIG. 8 by the hands-free telephone conversation connection module 102, the user operates the operating unit 14 of the hands-free device 1 and can thereby perform outgoing call processing and incoming call processing.

After the first data transfer control module 103 receives the outgoing call history data, the incoming call history data, and the unattended incoming call history data from the cellular phone 2 by the initial connection processing with the cellular phone 2 described in FIG. 8, the hands-free device 1 or the cellular phone 2 may execute new outgoing call processing, new incoming call processing, or new unattended incoming call processing. Then, when the user operates the operating unit 14 to make a request to display the outgoing call history data, the incoming call history data, or the unattended call history data, when a registered name corresponding to an outgoing call telephone number, an incoming call telephone number, or an unattended incoming call telephone number with which the new outgoing call processing, incoming call processing, or unattended incoming call processing has been performed is present in the telephone directory data transferred from the cellular phone 2, the display control module 105 causes the display unit 15 to display the registered name as illustrated in FIG. 11C, FIG. 12C, or FIG. 13C.

More specifically, it is assumed that the hands-free telephone conversation connection module 102 has performed outgoing call processing to the telephone number of "Ichiro Kato" as the new outgoing call processing. In this case, when the registered name "Ichiro Kato" is registered in the telephone directory data, the display control module 105 reads the registered name "Ichiro Kato" from the telephone directory data and causes the display unit 15 to display it as illustrated in FIG. 11C. When an incoming call occurs from the telephone number of "Ichiro Yoshimoto" as the new incoming call processing, when this incoming call telephone number is registered in the telephone directory data, the display control module 105 reads the registered name "Ichiro Yoshimoto" from the telephone directory data and causes the display unit 15 to display it as illustrated in FIG. 12C. When a new unattended incoming call occurs from the telephone number of "Saburo Watanabe," the display control module 105 reads the registered name "Saburo Watanabe" from the telephone directory data and causes the display unit 15 to display it as illustrated in FIG. 13C.

Upon the occurrence of a request to display all history data displaying the outgoing call history data, the incoming call history data, and the unattended incoming call history data collectively in reverse chronological order, as to the incoming call history data and the unattended incoming call history data, the display control module 105 selects and displays certain pieces of incoming call history data and the unattended incoming call history data with a later incoming call date and time or unattended incoming call date and time out of the whole of the data regardless of whether they are the same (duplicated) in the incoming call telephone number or the unattended incoming call telephone number. As to the outgoing call history data, the display control module 105 selects and displays only the latest outgoing call history data out of the outgoing call history data with the same (duplicated) outgoing call telephone number.

FIG. 14 is a diagram of exemplary outgoing call history data, incoming call history data, unattended incoming call history data, and all history data according to the present embodiment. In the example illustrated in FIG. 14, the outgoing call telephone number of "Taro Abe" is duplicated. In this case, the display control module 105 displays only the outgoing call history with the latest outgoing call date and time (the outgoing call history data with an outgoing call date and time of August 10 12:15) out of the outgoing call histories of "Taro Abe" and does not display the outgoing call history with the outgoing call date and time not being the latest.

The following describes a procedure in which the controller 12 receives the outgoing call history data, the incoming call history data, the unattended incoming call history data, and the telephone directory data from the cellular phone 2 and stores these therein and a procedure in which the controller 12 makes an outgoing call using the stored outgoing call history data, incoming call history data, and unattended incoming call history data in the hands-free device 1. The following describes the outgoing call history data and the incoming call history data; the same holds true for the unattended incoming call history data.

Figure 15:
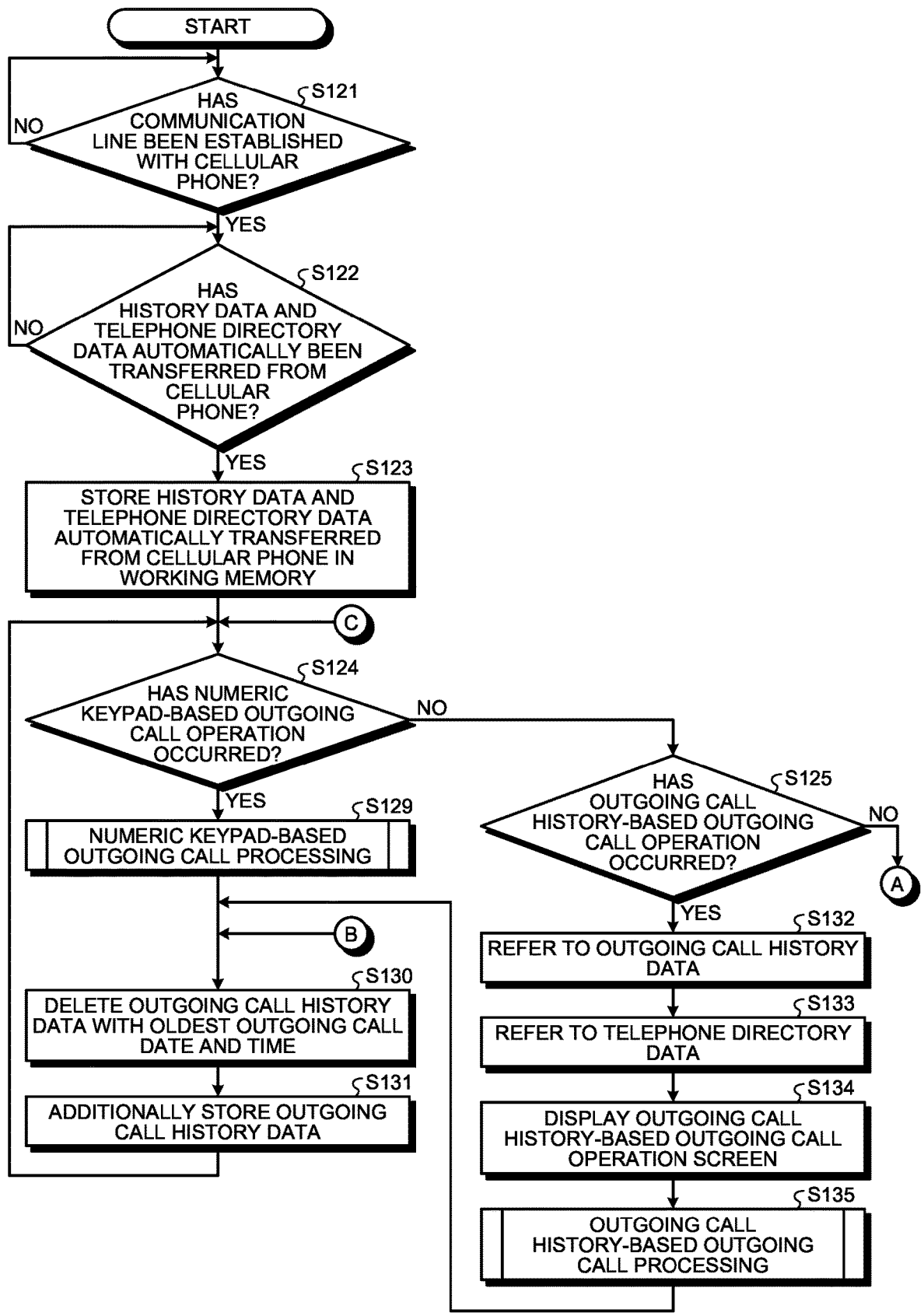
FIG. 15 is a diagram of an exemplary procedure of processing to make an outgoing call using the outgoing call history data, the incoming call history data, and the telephone directory data to be executed by the hands-free device of the first embodiment.
Figure 16:
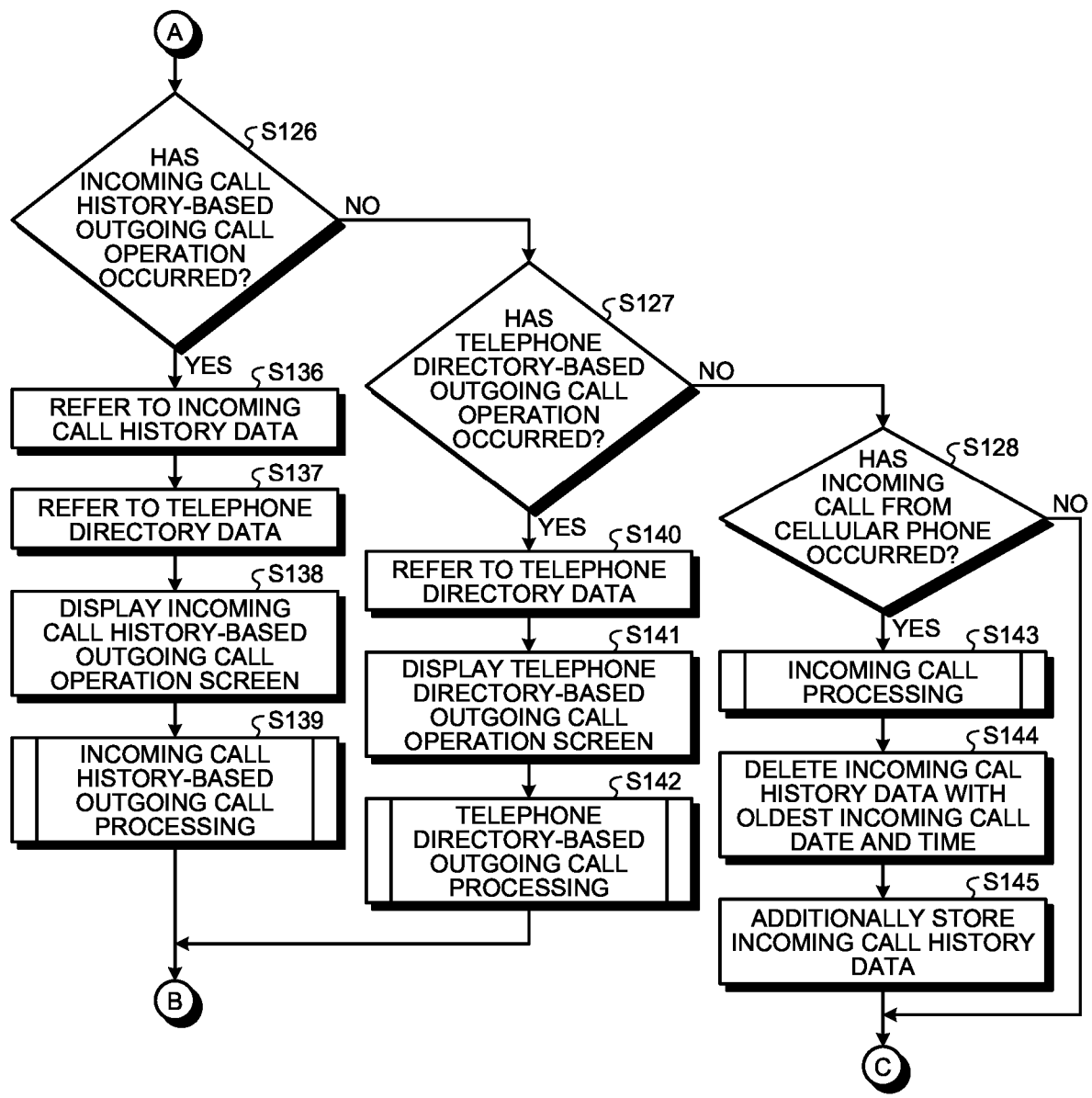
FIG. 16 is a diagram of an exemplary procedure of the processing to make an outgoing call using the outgoing call history data, the incoming call history data, and the telephone directory data to be executed by the hands-free device of the first embodiment.

FIG. 15 and FIG. 16 are diagrams of an exemplary procedure of processing to make an outgoing call using the outgoing call history data, the incoming call history data, and the telephone directory data to be executed by the hands-free device 1 of the present embodiment. The processing executed by the controller 12 in FIG. 15 and FIG. 16 is the processing implemented by the reception module 101, the hands-free telephone conversation connection module 102, the first data transfer control module 103, the second data transfer control module 104, the display control module 105, the reproduction module 106, or the deletion module 107 described in FIG. 3, for example.

FIG. 17 described in FIG. 15 and FIG. 16 is a diagram of exemplary outgoing call history data according to the present embodiment. FIG. 18 is a diagram of exemplary incoming call history data according to the present embodiment. FIG. 19 is a diagram of an exemplary transition of display screens when the user performs an outgoing call operation from an outgoing call history according to the present embodiment. FIG. 20 is a diagram of an exemplary transition of display screens when the user performs an outgoing call operation from an incoming call history according to the present embodiment. FIG. 21 is a diagram of an exemplary transition of display screens when the user performs an outgoing call operation from a telephone directory according to the present embodiment. FIG. 22 is a diagram of exemplary telephone directory data according to the present embodiment.

Referring back to the flowchart in FIG. 15, first, upon determining that the cellular phone 2 is present within the Bluetooth communication range of the hands-free device 1 and the Bluetooth communication unit 13 has established a communication line with the cellular phone 2 (Yes at S121), the controller 12 of the hands-free device 1 waits for the outgoing call history data, the incoming call history data, and the telephone directory data to be automatically transferred to the Bluetooth communication unit 13 from the cellular phone 2 (S122).

Upon determining that the outgoing call history data, the incoming call history data, and the telephone directory data have automatically been transferred from the cellular phone 2 (Yes at S122), the controller 12 causes the working memory 16 or the storage memory 17 to store therein the outgoing call history data, the incoming call history data, and the telephone directory data automatically transferred from the cellular phone 2 (S123).

It is assumed that the numbers of the outgoing call history data and the incoming call history data automatically transferred from the cellular phone 2 are each 20, for example. It is also assumed that the numbers of the outgoing call history data and the incoming call history data that can be stored in the working memory 16 are each five, for example. That is to say, the number of the outgoing call history data or the incoming call history data that can be stored in the working memory 16 is smaller than the number of the outgoing call history data or the incoming call history data automatically transferred from the cellular phone 2.

In this case, the controller 12 discards a piece of outgoing call history data with an older outgoing call date and time out of the outgoing call history data automatically transferred from the cellular phone 2 and causes the working memory 16 to store therein five pieces of outgoing call history data with later outgoing call dates and times with higher priority out of the 20 pieces of outgoing call history data automatically transferred from the cellular phone 2 as cellular phone outgoing call history data, for example. The controller 12 discards pieces of incoming call history data with an older incoming call date and time out of the incoming call history data and causes the working memory 16 to store therein five pieces of incoming call history data with later incoming call dates and times with higher priority out of the 20 pieces of incoming call history data automatically transferred from the cellular phone 2 as cellular phone incoming call history data.

Immediately after the outgoing call history data has automatically been transferred from the cellular phone 2, the controller 12 holds the outgoing call history data illustrated in FIG. 17(*a*) as the outgoing call history data of the working memory 16. When the user performs an operation to display the outgoing call history data in this state, the controller 12 causes the display unit 15 to display the display screen illustrated in FIG. 19(*b*). Immediately after the incoming call history data has automatically been transferred from the cellular phone 2, the controller 12 holds the incoming call history data illustrated in FIG. 18(*b*) as the incoming call history data of the working memory 16 and, when the user performs an operation to display the incoming call history data in this state, causes the display unit 15 to display the display screen illustrated in FIG. 20(*b*).

Thus, when the cellular phone 2 and the hands-free device 1 establish the Bluetooth communication line, the outgoing call history data and the incoming call history data stored by the cellular phone 2 before the Bluetooth communication line is established are automatically transferred to the working memory 16 of the hands-free device 1, thus the cellular phone 2 and the hands-free device 1 form one telephone system, and thus a hands-free telephone conversation can be held by this telephone system. After the cellular phone 2 and the hands-free device 1 thus form the one telephone system, the user selects any of a dial key input-based outgoing call operation, an outgoing call history-based outgoing call operation, an incoming call history-based outgoing call operation, and a telephone directory-based outgoing call operation and can thereby perform an outgoing call operation and can wait for an incoming call from the cellular phone network.

In the present embodiment, as a procedure of Bluetooth communication, serial profile switching is performed, in which the PBAP-based wireless communication connection is established at S5 illustrated in the flowchart of FIG. 8, then the PBAP-based wireless communication is disconnected at S8, and the HFP-based wireless communication connection is performed at S11. Thus, when a new incoming call occurs in the cellular phone 2 after the HFP-based wireless communication connection at S11, or when new outgoing call processing is performed by the operating unit 14, for the cellular phone 2, the incoming call history data and the outgoing call history data including the incoming call and the outgoing call are after all its own history data and are thus held in its own memory. Thus, the controller 12 of the hands-free device 1 can also perform the PBAP-based wireless communication during the HFP-based wireless communication (simultaneous connection) in order to again acquire these latest outgoing/incoming call history data from the cellular phone 2.

However, if simultaneous connection is avoided as much as possible, in the serial connection, when the HFP-based wireless communication connection is disconnected, and the PBAP-based wireless communication connection is performed, during the time the cellular phone 2 and the hands-free device 1 forming the one telephone system for holding a hands-free telephone conversation are substantially separated from each other, thus causing a state in which a hands-free telephone conversation cannot be held. Given these circumstances, in the present embodiment, when the HFP-based wireless communication connection is performed at S11, even after that, the hands-free device 1 acquires the latest outgoing/incoming call history data on its own and manages these on its own only by the HFP-based wireless communication connection. The following describes this point.

Referring back to the flowchart of FIG. 15, the controller 12 determines whether the user has performed the dial key input-based outgoing call operation (S124) and determines whether the user has performed the outgoing call history-based outgoing call operation (S125). Subsequently, in the flowchart of FIG. 16, the controller 12 determines whether the user has performed the incoming call history-based outgoing call operation (S126), determines whether the user has performed the telephone directory-based outgoing call operation (S127), and determines whether an incoming call has occurred from the cellular phone network (S128).

Upon determining that the user has performed the dial key input-based outgoing call operation (Yes at S124), the controller 12 performs outgoing call processing to make an outgoing call with the telephone number input with the dial keys by the user as an outgoing call telephone number (S129). Upon ending the dial key input-based outgoing call processing, the controller 12 deletes the outgoing call history data with the oldest outgoing call date and time out of the outgoing call history data stored in the working memory 16 at the point in time as illustrated in FIG. 17(*b*) (S130) and causes the working memory 16 to additionally store therein the latest outgoing call history data of the device representing the dial key input-based outgoing call as self-outgoing call history data (S131).

That is to say, when the user operates the dial keys to input a telephone number "09000000100," for example, to perform an operation to make an outgoing call with the telephone number "09000000100" as the outgoing call telephone number, the controller 12 causes the working memory 16 to additionally store therein the outgoing call history data representing the telephone number "09000000100" as the self-outgoing call history data as illustrated in FIG. 17(b). In this case, the controller 12 stores therein a date and time acquired by the GPS apparatus of the hands-free device 1 as an outgoing call date and time corresponding to the telephone number "09000000100" as a time stamp. That is to say, in FIG. 17(b), the outgoing call date and time of the latest telephone number "09000000100" is the date and time acquired by the GPS apparatus of the hands-free device 1, whereas the outgoing call dates and times of the residual four telephone numbers are dates and times acquired by the timepiece unit of the cellular phone 2. When the user performs an operation to display the outgoing call history data in this state, the controller 12 causes the display unit 15 to display the display screen illustrated in FIG. 19(c).

Upon determining that the user has performed the outgoing call history-based outgoing call operation by pressing a "history button" 4a and then pressing an "outgoing call history button" 4b (Yes at S125), the controller 12 refers to the outgoing call history data stored in the working memory 16 (S132), refers to the telephone directory data stored in the working memory 16 (S133), and causes the display unit 15 to display an outgoing call history-based outgoing call operation screen as illustrated in FIG. 19(b) and FIG. 19(c) (S134). In this case, the controller 12, if the outgoing call telephone number of the outgoing call history data is registered in the telephone directory data, causes the display unit 15 to display the registered name corresponding to the telephone number and, if the outgoing call telephone number of the outgoing call history data is not registered in the telephone directory data, causes the display unit 15 to display the telephone number.

Next, the controller 12 performs outgoing call processing to make an outgoing call with the telephone number selected by the user as the outgoing call telephone number (S135). Upon ending the outgoing call history-based outgoing call processing, the controller 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the device representing the outgoing call history-based outgoing call as the self-outgoing call history data (S131). In this case also, the controller 12 stores therein a date and time acquired by the GPS apparatus of the hands-free device 1 as an outgoing call date and time corresponding to the outgoing call telephone number as a time stamp.

Upon determining that the user has performed the incoming call history-based outgoing call operation by pressing the "history button" 4a and then pressing an "incoming call history button" 4c (Yes at S126), the controller 12 refers to the incoming call history data stored in the working memory 16 (S136), refers to the telephone directory data stored in the working memory 16 (S137), and causes the display unit 15 to display an incoming call history-based outgoing call operation screen as illustrated in FIG. 20(b) and FIG. 20(c) (S138). In this case, the controller 12, if the outgoing call telephone number of the incoming call history data is registered in the telephone directory data, causes the display unit 15 to display the registered name corresponding to the telephone number and, if the outgoing call telephone number of the incoming call history data is not registered in the telephone directory data, causes the display unit 15 to display the telephone number.

Next, the controller 12 performs outgoing call processing to make an outgoing call with the telephone number selected by the user as the outgoing call telephone number (S139). Upon ending the incoming call history-based outgoing call processing, the controller 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the device representing the incoming call history-based outgoing call as the self-outgoing call history data (S131). In this case also, the controller 12 stores therein a date and time acquired by the GPS apparatus of the hands-free device 1 as an outgoing call date and time corresponding to the outgoing call telephone number as a time stamp.

Upon determining that the user has performed the telephone directory-based outgoing call operation by pressing a "telephone directory" button 4d (Yes at S127), the controller 12 refers to the telephone directory data stored in the working memory 16 (S140) and causes the display unit 15 to display a telephone directory-based outgoing call operation screen as illustrated in FIG. 21(b) (S141). Next, the controller 12 performs outgoing call processing to make an outgoing call with the telephone number selected by the user out of items of the telephone directory-based outgoing call operation screen as the outgoing call telephone number (S142). Upon ending the telephone directory-based outgoing call processing, the controller 12, in this case also, deletes the outgoing call history data with the oldest outgoing call date and time out of the outgoing call history data stored in the working memory 16 at the point in time (S130) and causes the working memory 16 to additionally store therein the latest outgoing call history data of the device representing the telephone directory-based outgoing call as the self-outgoing call history data (S131). In this case also, the controller 12 stores therein a date and time acquired by the GPS apparatus of the hands-free device 1 as an outgoing call date and time corresponding to the outgoing call telephone number as a time stamp.

Further, upon determining that an incoming call has occurred from the cellular phone network from the cellular phone 2 via the Bluetooth communication unit 13 (Yes at S128), the controller 12 performs incoming call processing such as notification for providing notification of the incoming call (S143), and upon ending the incoming call processing, deletes the incoming call history data with the oldest incoming call date and time out of the incoming call history data stored in the working memory 16 at the point in time (S144), and causes the working memory 16 to additionally store therein the latest incoming call history data of the device representing the incoming call as self-incoming call history data (S145).

That is to say, upon receiving a telephone number "09000000200" as an incoming call telephone number from the cellular phone network via the Bluetooth communication unit 13, the controller 12 causes the working memory 16 to additionally store therein the incoming call history data representing the telephone number "09000000200" as the self-incoming call history data.

By doing so, even when the PBAP-based wireless communication connection is not performed after the HFP-based wireless communication connection at S11, when new incoming call processing or outgoing call processing occurs after S11, self-outgoing/incoming call history data can be added and displayed on the display unit 15. Consequently, there is still no need to perform HFP-and-PBAP simultaneous connection, and after the HFP-based wireless communication connection at S11, there is no need to disconnect the HFP-based wireless communication connection and to connect to the PBAP-based wireless communication connection, and thus the cellular phone 2 and the hands-free device 1 forming the one telephone system can be prevented from being substantially separated from each other.

The following describes processing to display the outgoing/incoming call history data received by the PBAP-based wireless communication and outgoing/incoming call history data occurring in the outgoing call processing and the incoming call processing occurring at and after S11.

In an HFP wireless-connected state at S11, the cellular phone 2 at the time of an incoming call transmits the incoming call telephone number to the hands-free device 1, in which incoming call date and time information is not transmitted. Thus, the controller 12 stores therein a date and time acquired by the GPS apparatus of the hands-free device 1 as the incoming call date and time corresponding to the telephone number "09000000200" as a time stamp. That is to say, in FIG. 18(*b*), the incoming call date and time of the latest telephone number "09000000200" is the date and time acquired by the GPS apparatus of the hands-free device 1, whereas the incoming call dates and times of the residual four telephone numbers are dates and times acquired by the timepiece unit of the cellular phone 2. When the user performs an operation to display the incoming call history data in this state, the controller 12 causes the display unit 15 to display the display screen illustrated in FIG. 20(*c*).

The foregoing describes a case in which when the number of the outgoing call history data or the incoming call history data that can be stored in the working memory 16 is smaller than the number of the outgoing call history data or the incoming call history data automatically transferred from the cellular phone 2, the outgoing call history data or the incoming call history data with an older outgoing call date and time or incoming call date and time out of the outgoing call history data or the incoming call history data automatically transferred from the cellular phone 2 is discarded, and the outgoing call history data or the incoming call history data with a later outgoing call date and time or incoming call date and time out of the outgoing call history data or the incoming call history data automatically transferred from the cellular phone 2 is stored in the working memory 16 with higher priority; a number (five in the present embodiment) to be automatically transferred to the cellular phone 2 by the hands-free device 1 when the PBAP-based wireless communication is connected may be designated, and the outgoing call history data or the incoming call history data with a later outgoing call date and time or incoming call date and time may be stored in the working memory 16 with higher priority.

The above configuration describes a case in which when new outgoing call processing or new incoming call processing is performed in the hands-free device 1, the oldest outgoing call history data or the oldest incoming call history data out of the outgoing call history data or the incoming call history data stored in the working memory 16 is deleted; from the viewpoint of the user, there is a demand such as described below, and thus the controller 12 may perform alternative processing described below. This is processing required when the PBAP-based wireless communication connection is not performed at and after S11 as in the present example.

That is to say, when the date and time measured by the timepiece unit of the cellular phone 2 and the date and time acquired by the GPS apparatus of the hands-free device 1 are compared with each other, the date and time measured by the timepiece unit of the cellular phone 2 may have a larger error and be incorrect compared with the date and time acquired by the GPS apparatus and can be set freely by the user and may thus be set forward or conversely be set backward by a certain time (10 minutes, for example) intentionally by the user.

Thus, if the user sets the date and time of the cellular phone 2 forward by the certain time, and the hands-free device 1 stores the date and time set forward in the working memory 16, when the outgoing call history data and the incoming call history data automatically transferred from the cellular phone 2 and the outgoing call history data and the incoming call history data of the hands-free device 1 itself are sorted in chronological order in this state, even though the outgoing call history data or the incoming call history data performing new outgoing call processing or new incoming call processing by the hands-free device 1 is the latest in terms of time axis, it is not displayed at the top column on a display screen in list form and is displayed at a column other than the top column (a second or third column, for example). This situation causes deviation between a time axis kept in mind by the user and a time axis displayed by the display unit 15 and thus causes the user to have a sense of discomfort.

To address this trouble, the controller 12 displays the outgoing call history data and the incoming call history data automatically transferred from the cellular phone 2 arranged in chronological order at columns other than the top column only within their range and displays the new outgoing call history data and the new incoming call history data of the device at the top column. Thus, the outgoing call history data and the incoming call history data can be displayed in harmony with the time axis kept in mind by the user, thus enabling the user not to have a sense of discomfort.

When displaying the outgoing call history data and the incoming call history data automatically transferred from the cellular phone 2 arranged in chronological order, even without sorting the outgoing call history data and the incoming call history data based on date and time data included in the outgoing call history data and the incoming call history data, if the outgoing call history data and the incoming call history data include outgoing call order data representing an outgoing call order and incoming call order data representing an incoming call order, respectively, the controller 12 may display the outgoing call history data and the incoming call history data arranged based on the outgoing call order data and the incoming call order data.

Even when the outgoing call order data and the incoming call order data are not explicitly included, when data is transmitted in list form as in FIG. 11A, FIG. 12A, and FIG. 13A from the cellular phone 2 and is received by the hands-free device 1, the data may be displayed based on a rule that upper data is later data. That is to say, the cellular phone 2 transmits the data in such a manner that an actual outgoing call order and incoming call order can be identified by the hands-free device 1.

In this case, in the cellular phone 2 of a certain type, when an incoming call occurred from A on 12:00:00, and an incoming call occurred from B on 12:00:30, for example, when the time stamp is represented in terms of up to minutes not seconds, they are absolutely the same 12:00, which is stored as the incoming call history data of the cellular phone 2. When these pieces of data are received by the hands-free device 1, and even if they are sorted in chronological order, they cannot be ranked, and thus it is convenient if the cellular phone 2 imparts the outgoing call order data and the incoming call order data or transmits them in list form described above. Thus, the incoming call history data can be displayed in harmony with the time axis kept in mind by the user, thus enabling the user not to have a sense of discomfort.

In these cases, the date and time data included in the outgoing call history data and the incoming call history data is secondary, and the outgoing call order data and the incoming call order data described above are actual incoming call order and outgoing call order of the user. The cellular phone 2 repeats the incoming call processing and the outgoing call processing in its single operations; they are its own single operations, thus this can grasp outgoing/incoming call orders, and thus outgoing/incoming call histories can be managed according to those orders. Thus, without being bound by the outgoing call date and time and the incoming call date and time by its own timepiece unit, the cellular phone 2 transmits each outgoing call and each incoming call to the hands-free device 1 with the outgoing call order data and the incoming call order data imparted thereto, and the hands-free device 1 performs processing to arrange the outgoing/incoming call history data based on the incoming call order data and the outgoing call order data. Alternatively, the list formed with an actual outgoing call order and incoming call order determined by the cellular phone 2 without imparting the outgoing call order data and the incoming call order data is transmitted to the hands-free device 1, and the hands-free device 1 performs processing to arrange the outgoing/incoming call history data in order of actual outgoing call/incoming call orders in accordance with the rule.

By doing so, if the timepiece of the cellular phone 2 is set forward or backward at a certain timing, when an outgoing call or an incoming call occurs immediately thereafter, outgoing call history display and incoming call history display of the cellular phone 2 are displayed in accordance with the actual orders, whereas the outgoing call date and time and the incoming call date and time attached to each data are different from the display order. Consequently, when such outgoing/incoming call history data is sorted based on the outgoing call date and time and the incoming call date and time by the hands-free device 1, it is displayed in order different from the actual one. It is thus said that the method of the outgoing call order data and the incoming call order data or the list form method are advantageous for the outgoing/incoming call history data to be arranged in the actual outgoing/incoming call orders.

Consequently, the controller 12 can display the data on the display unit 15 as the actual outgoing call order and incoming call order by the cellular phone 2. After performing such data processing and then performing the outgoing call processing by its own dial key input, the outgoing call history-based outgoing call processing, the incoming call history-based outgoing call processing, and the telephone directory data-based outgoing call processing as described above, the hands-free device 1 deletes the outgoing call history data with the oldest outgoing call order data or the outgoing call history data with the outgoing call order data regarded as being the oldest out of the outgoing call history data stored in the working memory 16 at the point in time and additionally causes the working memory 16 to store therein the latest outgoing call history data of the device representing the outgoing call by the outgoing call history as the self-outgoing call history data. Meanwhile, when new incoming call processing occurs, the controller 12 deletes the incoming call history data with the oldest incoming call order data or the incoming call history data with the incoming call order data regarded as being the oldest out of the incoming call history data stored in the working memory 16 at the point in time and causes the working memory 16 to additionally store therein the latest incoming call history data of the device representing the incoming call by the incoming call history data as the self-incoming call history data.

In these outgoing call processing and the incoming call processing, the controller 12 stores therein the date and time acquired by the GPS apparatus of the hands-free device 1 as the outgoing call date and time corresponding to the outgoing call telephone number and the incoming call date and time corresponding to the incoming call telephone number as a time stamp. Thus, the outgoing call history data and the incoming call history data can be displayed in harmony with the time axis kept in mind by the user, thus enabling the user not to have a sense of discomfort.

Upon a request to display all history data collectively displaying the outgoing call history data and the incoming call history data, the controller 12 requires certain sorting processing compared with a case in which only the outgoing call history data or only the incoming call history data is displayed. That is to say, when the incoming call history data and the outgoing call history data are transmitted as the actual time axis with the outgoing call order data and the incoming call order data included so that the chronological order can be grasped or transmitted in list form described above without including these data from the cellular phone 2 as described above, when displaying the received data in order as notified not based on the outgoing call date and time and the incoming call date and time included in the received data as described above, the hands-free device 1 displays the received data as the display order by the cellular phone 2 in the case of only the outgoing call history display and only the incoming call history display.

When displaying all data, the hands-free device 1 can grasp the latest data out of the outgoing call history data and the latest data out of the incoming call history data but may have difficulty in actually identifying which of the two pieces of latest data is the latest. Given these circumstances, in the present example, when displaying all history data, the controller 12 compares the outgoing call date and time included in the outgoing call history data and the incoming call date and time included in the incoming call history data with each other and displays one with the latest date and time as the latest data. For a case of five pieces of incoming call history data and five pieces of outgoing call history data, for example, the controller 12 sorts the ten pieces of data in chronological order and displays them in this order. Thus, in almost all cases, the outgoing call history data and the incoming call history data can be displayed in order almost as the actual time axis of the user. However, when the time stamp function of the cellular phone 2 is up to "minutes," when an incoming call occurred from A on 12:00:00, and then an outgoing call was made to B on 12:00:30, the outgoing call date and time and the incoming call date and time are absolutely the same 12:00, and thus in this case, the controller 12 performs certain sorting processing such that the outgoing call is displayed to be later than the incoming call or vice versa.

When the chronological order of three pieces of incoming call history data (A to C) received by the PBAP-based wireless communication can be grasped as described above, and the chronological order of outgoing call history data (D to F) received by PBAP can be grasped, the controller 12 compares the dates and times of the outgoing call history data and the incoming call history data with each other as follows and performs sorting processing.

First, the controller 12 compares the dates and times of A and D with each other and sets the later one to be the first (A, for example) and then compares B and D with each other and sets the later one to be the second (B, for example). Next, the controller 12 compares C and D with each other and sets the later one to be the third (D, for example) and then compares the dates and times of C and E with each other and sets the later one to be the fourth (C, for example). Next, for the residual E and F, E is later, and the controller 12 sets the fifth to be E and sets the sixth to be F. When the dates and times compared with each other are the same, the controller 12 sorts the incoming call history data and the outgoing call history data such that the outgoing call is put on a higher priority than the incoming call or vice versa as a certain sorting rule.

There are circumstances that the cellular phone 2, when transferring the telephone directory data, is required to transfer it with the data format of the telephone directory data converted into a data format of "vCard" prescribed in the Bluetooth communication standard and the telephone directory data in general has a lower frequency of data update than that of the outgoing call history data and the incoming call history data. Given these circumstances, the controller 12 may first receive the outgoing call history data and the incoming call history data by the Bluetooth communication unit 13 from the cellular phone 2 and then receive the telephone directory data by the Bluetooth communication unit 13 from the cellular phone 2. The controller 12 may receive the outgoing call history data and the incoming call history data by the Bluetooth communication unit 13 from the cellular phone 2 and then receive the telephone directory data by the Bluetooth communication unit 13 from the cellular phone 2 only when the user performs a certain operation on the operating unit 14.

As to whether the telephone directory data is transferred by such a user operation or is automatically transferred, the user may select and set manual transfer or automatic transfer by the hands-free device 1, and the transfer processing may be performed in accordance with this setting. With the setting by automatic transfer set to "not transfer," after the HFP-based wireless connection at S9, the user may be able to perform a manual transfer operation to transfer only the telephone directory data. However, by this manual transfer operation, the HFP-based wireless communication connection at S9 is disconnected, and the PBAP-based wireless communication connection is established, and upon ending the data transfer, the HFP-based wireless communication is again connected for the cellular phone 2 to enable a hands-free telephone conversation.

When this "not transfer" is set, the outgoing call history data and the incoming call history data, which have a higher frequency of data update, can be received with higher priority than the telephone directory data, which has a lower frequency of data update, and owing to the circumstances that although data conversion is not required to transfer the outgoing call history data and the incoming call history data, data conversion is required to transfer the telephone directory data, the outgoing call history data and the incoming call history data, which have a shorter transfer time, can be received with higher priority than the telephone directory data, which has a longer transfer time. Only the outgoing call history data and the incoming call history data are transferred, whereby a data amount to be transferred can be reduced. Consequently, transfer protocol-based communication can be performed early, and subsequent hands-free protocol-based communication can be performed early, and thus when the cellular phone is carried into the vehicle, a time until a hands-free telephone conversation is performed can be reduced. Further, whether the telephone directory data, which has a lower frequency of data update and a longer transfer time, is received can be selected as needed, which can improve convenience.

When the telephone directory data is transferred as needed by the manual transfer operation by the user, upon ending transfer, the hands-free protocol-based communication is automatically executed, and thus when an outgoing call is made using the telephone directory data, a hands-free telephone conversation can be held, which improves convenience. Further, when transfer of the telephone directory data by the manual transfer operation is performed, only the telephone directory data may be stored in the non-volatile storage memory 17, and the stored data may be read from the storage memory 17 at the time of the next start-up of the hands-free device 1 and be used as the telephone directory data.

The controller 12 may cause the working memory 16 to store therein the outgoing call history data, the incoming call history data, the telephone directory data, the message record data, and the answerphone data received from the cellular phone 2 in a distinguished manner for each cellular phone 2. In this case, the controller 12 associates the cellular phone 2 and the data stored in the working memory 16 with each other as follows, for example. That is to say, when the outgoing call history data, the incoming call history data, the telephone directory data, the message record data, and the answerphone data received from the cellular phone 2 are stored in the working memory 16, a link key is generated based on a cellular phone ID individually imparted to the cellular phone 2 received from the cellular phone 2 and an apparatus ID individually imparted to the hands-free device 1, and the generated link key is stored in the working memory 16 in association with the various kinds of data. When receiving the cellular phone ID from the cellular phone 2 from that point on, the controller 12 again generates the link key based on the received cellular phone ID and apparatus ID and updates the various kinds of data stored in the working memory 16 in association with the generated link key.

Figure 23:
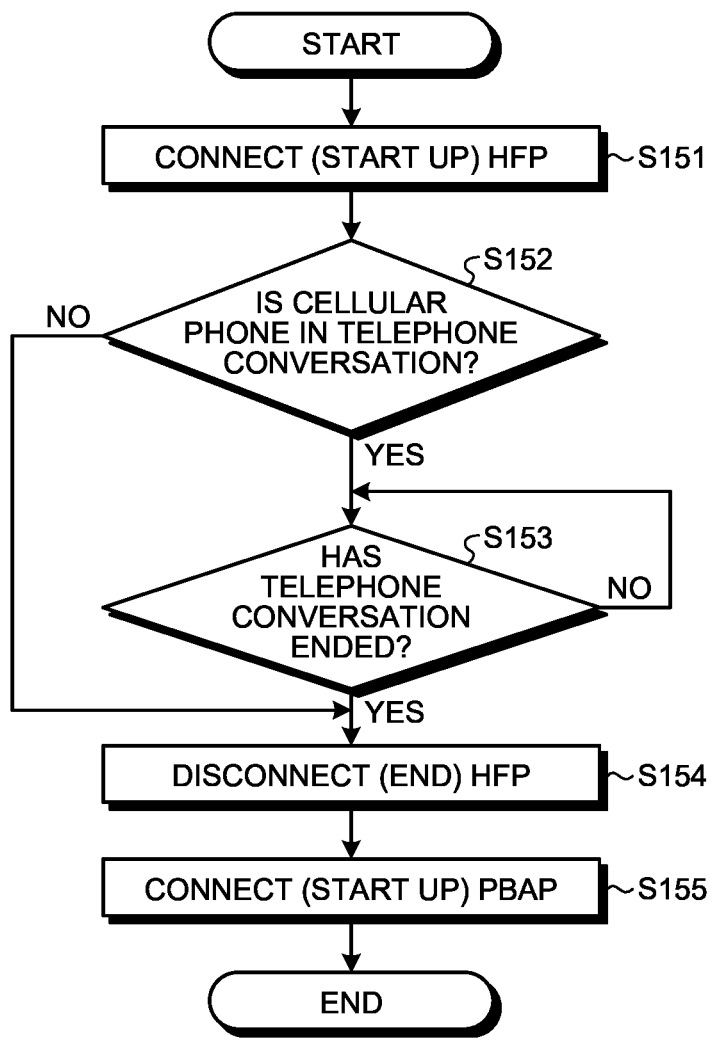
FIG. 23 is a flowchart of details of a procedure of HFP processing according to the first embodiment.

The following describes the HFP processing at S2 in the flowchart of FIG. 8 described above in detail. FIG. 23 is a flowchart of details of a procedure of the HFP processing according to the present embodiment.

If the hands-free telephone conversation connection module 102 determines that a communication line has been established with the cellular phone 2 present within the Bluetooth communication range, the hands-free telephone conversation connection module 102 connects (starts up) the HFP-based wireless communication connection (S151) and determines whether the cellular phone 2 is during telephone conversation (S152). Whether the cellular phone 2 is during telephone conversation or on standby is notified by the HFP-based wireless communication, is received by the hands-free device 1, and is determined by the received communication state. S151 corresponds to the processing at S2.

If the hands-free telephone conversation connection module 102 determines that the cellular phone 2 is not during telephone conversation, that is, has been on standby waiting for an incoming call (No at S152), the hands-free telephone conversation connection module 102 disconnects (ends) the connected HFP-based wireless communication (S154), and the first data transfer control module 103 connects the PBAP-based wireless communication (S155). That is to say, if the cellular phone 2 is not during telephone conversation, the hands-free telephone conversation connection module 102 quickly automatically disconnects the connected HFP-based wireless communication and automatically connects the PBAP-based wireless communication to cause the Bluetooth communication unit 13 to receive the outgoing call history data, the incoming call history data, and the telephone directory data transmitted from the cellular phone 2.

If the hands-free telephone conversation connection module 102 determines that the cellular phone 2 is during telephone conversation (Yes at S152), the hands-free telephone conversation connection module 102 maintains the HFP-based wireless communication in consideration of the possibility that the telephone conversation is executed as a hands-free telephone conversation using the hands-free device 1. Whether this telephone conversation is executed basically depends on the cellular phone 2; when the HFP-based wireless communication connection is established while the cellular phone 2 is during telephone conversation, the cellular phone 2 may automatically transmit received voices to the Bluetooth communication unit 13, whereas an operation on the cellular phone 2 may transmit the received voices to the Bluetooth communication unit 13.

The hands-free telephone conversation connection module 102 determines whether the cellular phone 2 has ended the telephone conversation (S153) and, if determined that the cellular phone 2 has ended the telephone conversation (Yes at S153), disconnects (ends) the connected HFP-based wireless communication (No at S154), and the first data transfer control module 103 connects the PBAP-based wireless communication (S155). That is to say, when the cellular phone 2 is during telephone conversation, the hands-free telephone conversation connection module 102 disconnects the connected HFP-based wireless communication after the telephone conversation has ended and connects the PBAP-based wireless communication to cause the Bluetooth communication unit 13 to receive the outgoing call history data, the incoming call history data, and the telephone directory data transmitted from the cellular phone 2 after the user has ended the hands-free telephone conversation. S152 and S153 correspond to the processing between S3 and S4.

When the cellular phone 2 is thus connected to the hands-free device 1, the hands-free device 1 determines whether the cellular phone 2 is during telephone conversation and, if the cellular phone 2 is during telephone conversation, when the HFP-based wireless communication is switched to the PBAP-based wireless communication connection, the telephone conversation cannot shift to a hands-free telephone conversation, and thus the HFP-based wireless communication is maintained, and while the cellular phone 2 is during telephone conversation, the PBAP-based wireless communication connection is not performed. Upon determining the end of the telephone conversation, the HFP-based wireless communication is disconnected, and the PBAP-based wireless communication connection is performed. Consequently, when the cellular phone 2 is singly during telephone conversation, the telephone conversation can smoothly be switched to a hands-free telephone conversation.

The controller 12 may receive a responded incoming call history and a non-responded incoming call (unattended incoming call) history as the incoming call history data from the cellular phone 2 and store these therein in a distinguished manner. FIG. 24 is a diagram of another exemplary transition of display screens when the user performs an outgoing call operation from the incoming call history according to the present embodiment. If the controller 12 determines that the user has performed the incoming call history-based outgoing call operation by pressing the "history button" 4a and then pressing the "incoming call history button" 4c, the controller 12 refers to the incoming call history data stored in the working memory 16, refers to the telephone directory data stored in the working memory 16, and causes the display unit 15 to display the incoming call history-based outgoing call operation screen as illustrated in FIGS. 24(b) and 24(c); either an icon figure representing that the incoming call is a responded incoming call (a figure as a combination of a handset and an arrow) or an icon figure representing that the incoming call is a non-responded incoming call (unattended incoming call) (a figure as a combination of a handset and a x mark) is displayed for each data.

The present embodiment describes a case in which the working memory 16 stores therein the outgoing call history data, the incoming call history data, the telephone directory data, the message record data, and the answerphone data transferred from the cellular phone 2 and a case in which the storage memory 17 stores therein the telephone directory data; the storage memory 17 may store therein the outgoing call history data, the incoming call history data, the telephone directory data, the message record data, and the answerphone data transferred from the cellular phone 2. In this configuration, even when the power of the hands-free device 1 is turned off, the outgoing call history data, the incoming call history data, the telephone directory data, the message record data, and the answerphone data stored in the storage memory 17 are held.

Thus, the hands-free device 1 of the present embodiment connects to the cellular phone 2 in a hands-free telephone conversation-enabled manner pursuant to HFP and receives at least one of the outgoing call history data, the incoming call history data, the unattended incoming call history data, and the telephone directory data stored in the cellular phone 2 from the cellular phone 2 by the communication protocol pursuant to PBAP. When the cellular phone 2 receives the voice message such as the message record or the answerphone record, the hands-free device 1 receives at least one of information on the voice message such as the message record and information on the answerphone record from the cellular phone 2. Thus, the hands-free device 1 of the present embodiment, in connecting to the cellular phone 2 by the communication protocols pursuant to HFP and PBAP, when the cellular phone 2 receives the voice message such as the message record or registration of the answerphone record to the answerphone service, the user can reproduce the message record or check the contents of the answerphone record from the hands-free device 1.

When receiving the information on the voice message such as the message record or the information on the answerphone record from the cellular phone 2, the hands-free device 1 of the present embodiment causes the display unit 15 to display the notification of the voice message or the answerphone record. Thus, the hands-free device 1 of the present embodiment easily enables the user to grasp reception of the voice message or the answerphone record.

The hands-free device 1 of the present embodiment displays the icon 150 providing notification of the presence of the voice message such as the message record or the answerphone record on the display unit 15. Thus, the hands-free device 1 of the present embodiment easily enables the user to grasp reception of the voice message or the answerphone record by visually representing it with the icon 150.

The hands-free device 1 of the present embodiment displays the pop-up image 153 providing notification of the presence of the answerphone record on the display unit 15 and can thereby present reception of the answerphone record to the user in a more emphasized manner.

When receiving from the user an operation to reproduce the voice message such as the message record, the hands-free device 1 of the present embodiment reproduces the voice message such as the message record. Thus, the hands-free device 1 of the present embodiment enables the user to listen to the voice message such as the message record by operating the hands-free device 1 even without operating the cellular phone 2.

When receiving from the user an operation to reproduce the answerphone record, the hands-free device 1 of the present embodiment accesses the answerphone service via the cellular phone 2. Thus, the hands-free device 1 of the present embodiment enables the user to listen to the answerphone message registered in the answerphone service by operating the hands-free device 1 even without operating the cellular phone 2.

Second Embodiment

In the first embodiment described above, when the hands-free device 1 connects to the cellular phone 2, as the initial data transfer processing, the message record data and the answerphone data are transferred from the cellular phone 2 to the hands-free device 1. In this second embodiment, in the initial data transfer processing, only when there are any unattended incoming call histories in the cellular phone 2, the message record data and the answerphone data are transferred from the cellular phone 2 to the hands-free device 1.

The configuration of the hands-free device 1 of the present embodiment is similar to that of the first embodiment. The second data transfer control module 104 of the present embodiment determines the presence or absence of unattended incoming calls based on the unattended incoming call history data in addition to the functions of the first embodiment. When the cellular phone 2 has unattended incoming calls, the second data transfer control module 104 receives information on the voice message or the answerphone record from the cellular phone 2.

Figure 25:
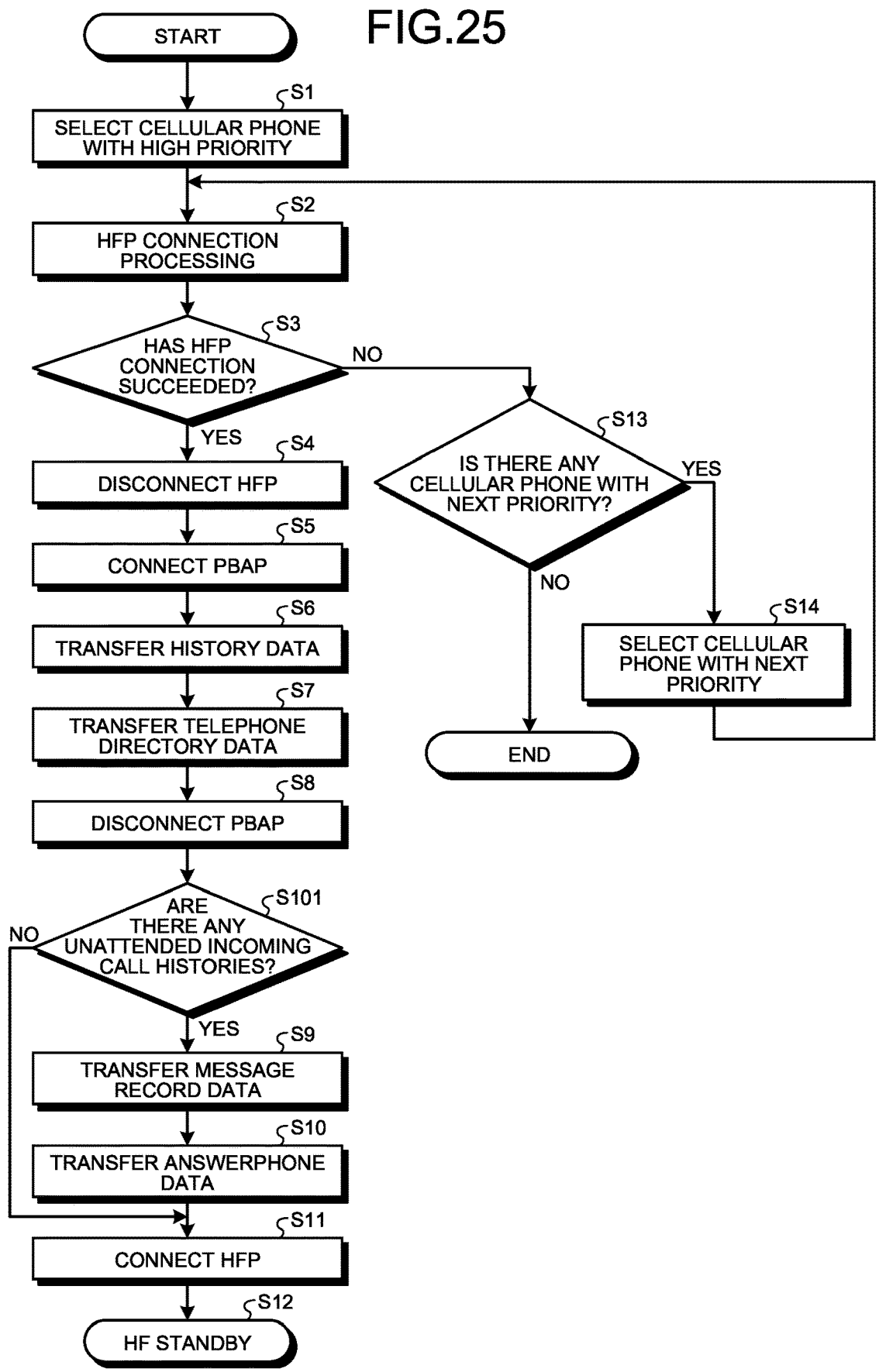
FIG. 25 is a diagram of an exemplary procedure of data transfer processing according to a second embodiment.

FIG. 25 is a diagram of an exemplary procedure of data transfer processing according to the present embodiment. The processing of selection of the cellular phone 2 at S1 to the processing of disconnection of PBAP at S8 illustrated in FIG. 25 are similar to those of the first embodiment described in FIG. 8.

The second data transfer control module 104 of the present embodiment determines the presence or absence of unattended incoming call histories (S101). More specifically, the second data transfer control module 104 determines whether one or more unattended incoming call histories are registered in the unattended incoming call history data acquired from the cellular phone 2 by the first data transfer control module 103 in the processing at S6.

If the second data transfer control module 104 determines that there are any unattended incoming call histories (Yes at S101), the second data transfer control module 104 executes the processing to transfer the message record data at S9 and the processing to transfer the answerphone data at S10.

If the second data transfer control module 104 determines that there are no unattended incoming call histories (No at S101), the second data transfer control module 104 does not execute the processing to transfer the message record data at S9 and the processing to transfer the answerphone data at S10. In this case, the hands-free telephone conversation connection module 102 executes the HFP connection processing at S11.

Thus, when the cellular phone 2 has unattended incoming calls, the hands-free device 1 of the present embodiment receives the voice message such as the message record or the answerphone data from the cellular phone 2. Basically, when there are no unattended incoming calls, the voice message such as the message record or the answerphone data is not registered in the cellular phone 2, and thus the hands-free device 1 of the present embodiment executes the processing to transfer these data only when there is a possibility that the voice message or the answerphone data is registered. Thus, the hands-free device 1 of the present embodiment can reduce making an unnecessary data transfer request to the cellular phone 2 and reduce a processing load.

Third Embodiment

The timing of data transfer between the hands-free device 1 and the cellular phone 2 is not limited to the details of the first and second embodiments described above. This third embodiment exemplifies data transfer processing when HFP and PBAP are simultaneously connected.

Figure 26:
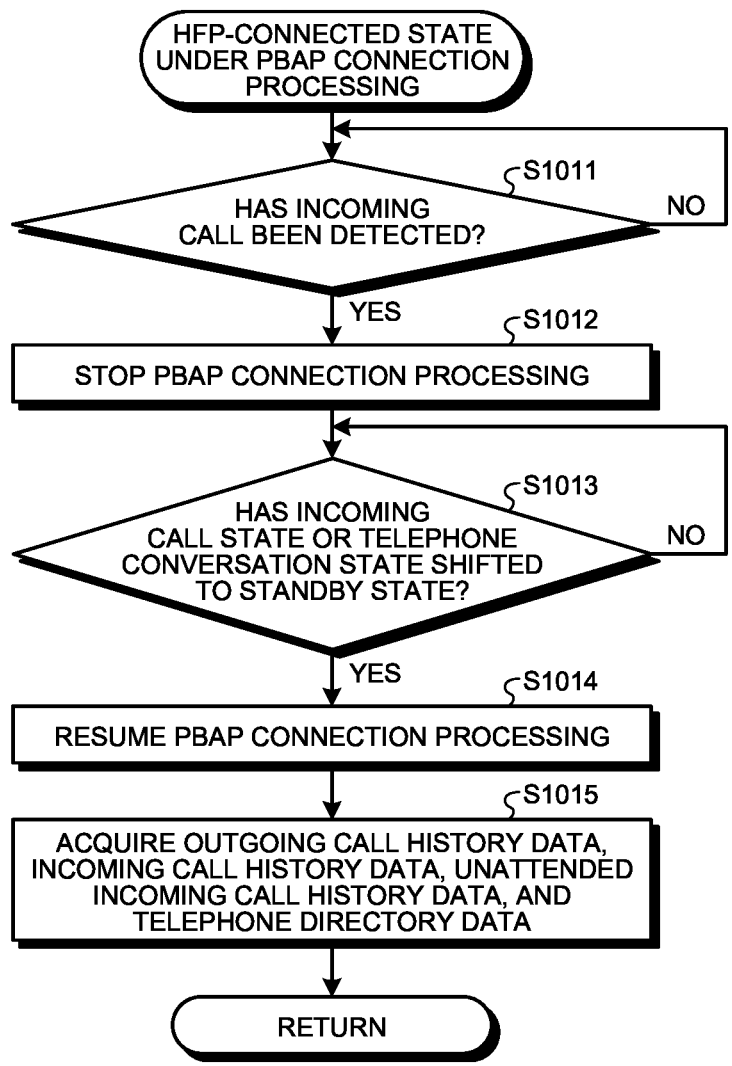
FIG. 26 is a flowchart of an exemplary procedure of processing when the cellular phone receives an incoming call during PBAP connection according to a third embodiment.

FIG. 26 is a flowchart of an exemplary procedure of processing when the cellular phone 2 receives an incoming call during PBAP connection according to the present embodiment. Assuming the processing of FIG. 26, the hands-free device 1 is in an HFP-connected state and under PBAP connection processing with the cellular phone 2.

The processing executed by the controller 12 in the flowcharts in FIG. 26 and FIG. 27 to FIG. 33 described below is processing implemented by the reception module 101, the hands-free telephone conversation connection module 102, the first data transfer control module 103, the second data transfer control module 104, the display control module 105, the reproduction module 106, or the deletion module 107 described in FIG. 3, for example.

In FIG. 26, if the controller 12 determines that the cellular phone 2 has detected an incoming call in the HFP-connected state and under the PBAP connection processing (Yes at S1011), the controller 12 stops the PBAP connection processing (S1012) and determines whether the incoming call state or a telephone conversation state related to the incoming call has ended to shift to a standby state (S1013). Information for determining whether the cellular phone 2 is in the standby state is notified on HFP and is notified from the cellular phone 2 each time its own communication state (standby state, during outgoing call, during incoming call, and during telephone conversation) changes. The information for determining whether the cellular phone 2 is in the standby state may be received and obtained on demand from the hands-free device 1.

If the controller 12 determines that the incoming call state or the telephone conversation state has shifted to the standby state owing to the fact that the hands-free device 1 has rejected the incoming call, that the cellular phone 2 has rejected the incoming call, that the outgoing call counterpart has undone (canceled) the outgoing call or has ended the telephone conversation, or that the telephone conversation has ended by an operation on the cellular phone 2 or the hands-free device 1 (Yes at S1013), the controller 12 resumes the PBAP connection processing from the beginning (S1014) and acquires the outgoing call history data, the incoming call history data, the unattended incoming call history data, and the telephone directory data from the cellular phone 2 (S1015). Thus, even when the cellular phone 2 has detected an incoming call under the PBAP connection processing, the incoming call state or the telephone conversation state related to the incoming call has ended to shift to the standby state, and then the PBAP connection processing is resumed from the beginning, whereby the hands-free device 1 can appropriately receive the outgoing call history data, the incoming call history data, the unattended incoming call history data, and the telephone directory data from the cellular phone 2 and maintain these various kinds of data to be the same as the various kinds of data of the cellular phone 2. In particular, the hands-free device 1 can also obtain the data related to the incoming call at S1011 as the incoming call history data.

At S1014, when the incoming call state has shifted to the standby state, the PBAP connection is started from the beginning; the reason for this is as follows. At the point in time when the incoming call state is detected, new incoming call history data occurs in the cellular phone 2. At the point in time when the incoming call state is detected, PBAP-based initial connection processing can be started, but if the incoming call still continues at the point in time when the initial connection processing is performed to start data transfer, it is unclear whether the incoming call is an unattended incoming call or a responded incoming call. Given these circumstances, if the data related to the incoming call is received in this state, the hands-free device 1 cannot perform display in a distinguished manner whether it is the unattended incoming call or the responded incoming call in the display of the incoming call history. Given these circumstances, when the incoming call state has shifted to a different state, that is, when the incoming call state has shifted to the standby state not through the telephone conversation state or when the incoming call state has shifted to the telephone conversation state, the PBAP-based initial connection processing and the data transfer are performed again from the beginning.

In the present embodiment, the incoming call state finally shifts to the standby state such as a case in which the incoming call state shifts to the standby state through the telephone conversation state or a case in which the incoming call state shifts to the standby state not through the telephone conversation state, and thus the standby state is detected to start the PBAP connection from the beginning. It is understood that the telephone conversation state may be detected from the incoming call state, which may be a trigger for the PBAP connection.

Figure 27:
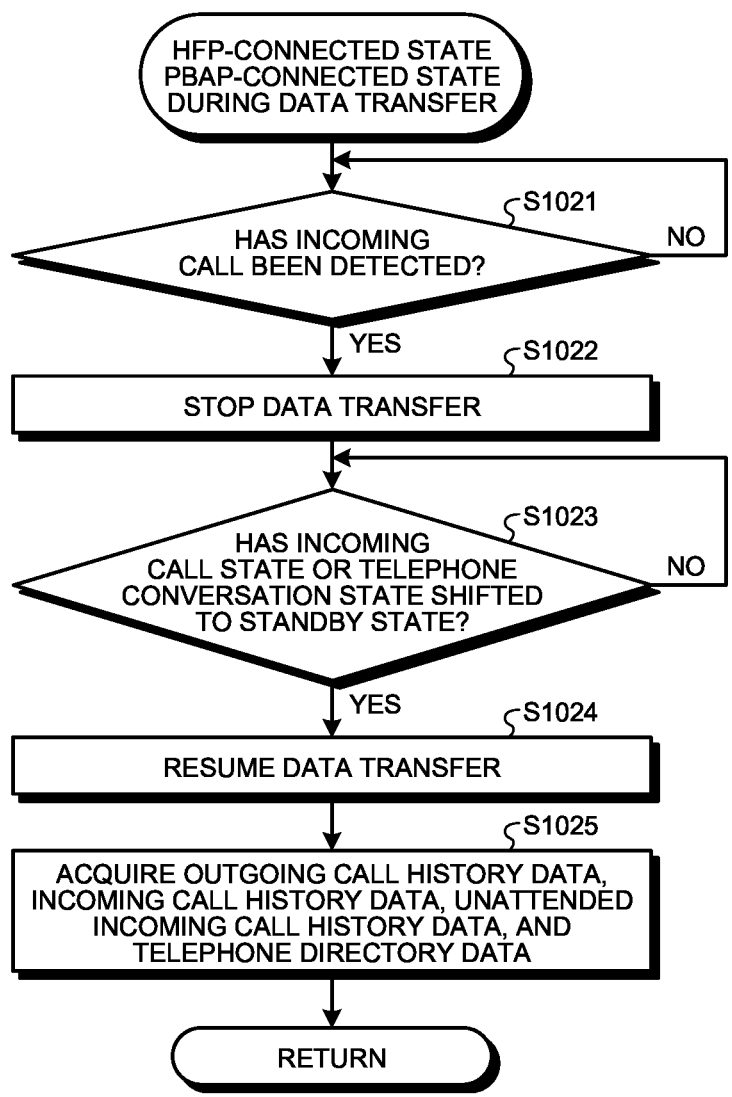
FIG. 27 is a flowchart of an exemplary procedure of processing when an incoming call occurs while data is transferred in an HFP-connected state and a PBAP-connected state according to the third embodiment.

FIG. 27 is a flowchart of an exemplary procedure of processing when an incoming call occurs while data (the outgoing call history data, the incoming call history data, the unattended incoming call history data, and the telephone directory data) is transferred in an HFP-connected state and a PBAP-connected state according to the present embodiment.

FIG. 26 describes the processing when an incoming call occurs in the HFP-connected state and under the PBAP initial connection processing; FIG. 27 represents processing when an incoming call occurs while data (the outgoing call history data, the incoming call history data, the unattended incoming call history data, and the telephone directory data) is transferred in the HFP-connected state and the PBAP-connected state. FIG. 27 corresponds to a case in FIG. 26 in which while determined to be "No" at S1011, the PBAP connection processing is completed, the process shifts to the data transfer processing, and, when the process becomes under data transfer, the process is under data transfer at S1015.

In FIG. 27, if the controller 12 determines that the cellular phone 2 has detected an incoming call while the data is transferred in the HFP-connected state and the PBAP-connected state (Yes at S1021), the controller 12 stops the data transfer (S1022) and determines whether the incoming call state or a telephone conversation state related to the incoming call has ended to shift to the standby state (S1023). If the controller 12 determines that the incoming call state or the telephone conversation state has shifted to the standby state owing to the fact that the hands-free device 1 has rejected the incoming call, that the cellular phone 2 has rejected the incoming call, or that the outgoing call counterpart has canceled the outgoing call or has ended the telephone conversation (Yes at S1023), the controller 12 resumes the data transfer from the beginning (S1024) and acquires the outgoing call history data, the incoming call history data, the unattended incoming call history data, and the telephone directory data from the cellular phone 2 (S1025). Thus, even when the cellular phone 2 has detected an incoming call while the data is being acquired in the PBAP-connected state, the incoming call state or the telephone conversation state related to the incoming call has ended to shift to the standby state, and then the PBAP connection processing is resumed from the beginning, whereby the hands-free device 1 can appropriately acquire the outgoing call history data, the incoming call history data, the unattended incoming call history data, and the telephone directory data from the cellular phone 2 and maintain these various kinds of data to be the same as the various kinds of data of the cellular phone 2. In particular, the hands-free device 1 can also obtain the data related to the incoming call at S1021 as the incoming call history data. At S1024, when the incoming call state has shifted to the standby state, the PBAP connection is started from the beginning; the reason for this is the same reason as the description at S1014 described above.

The foregoing describes an example in which the cellular phone 2 has been carried into the vehicle, and the HFP connection, the PBAP connection, and the data transfer with the hands-free device 1 are first performed; the following describes simultaneous connection processing after PBAP-based data transfer has succeeded.

In the present embodiment, PBAP has ended data transfer, but its connection itself is maintained, providing an HFP-and-PBAP simultaneous connected state; in this state, on demand from the hands-free device 1 or based on self-determination, PBAP-based data transfer can be started at a certain timing. Thus, as an on-vehicle hands-free system, even when a new incoming call or outgoing call occurs, the latest outgoing call history data, incoming call history data, and unattended call history data of the cellular phone 2 can be updated. The following describes this point with reference to FIG. 28 to FIG. 33.

As an assumption, after the HFP connection, when an incoming call occurs in the cellular phone 2, for the cellular phone 2, the incoming call history data and the outgoing call history data including the incoming call and the outgoing call are after all its own history data and are thus held in the memory of the cellular phone 2 itself. After the HFP connection, when outgoing call processing is performed by the cellular phone 2 via the Bluetooth communication unit 13 by the operating unit 14, the telephone number of the outgoing call destination is sent to the cellular phone 2 via the Bluetooth communication unit 13, and thus the outgoing call history data including the outgoing call is after all the history data of its own and is thus held in the memory of the cellular phone 2 itself.

Figure 28:
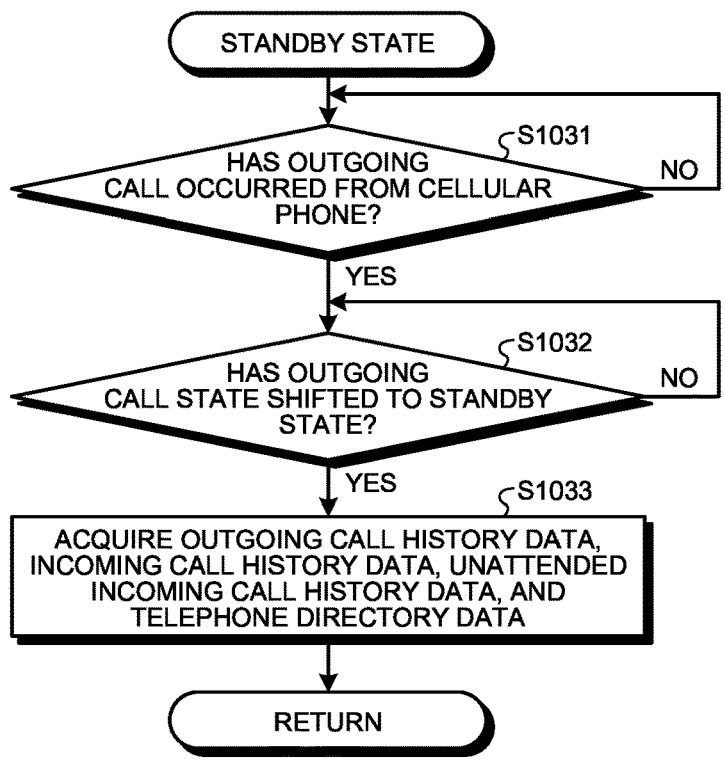
FIG. 28 is a flowchart of an exemplary procedure of data transfer processing when outgoing call processing is performed by an operation on an operating unit of the cellular phone according to the third embodiment.

FIG. 28 is a flowchart of an exemplary procedure of data transfer processing when outgoing call processing is performed by an operation on the operating unit of the cellular phone according to the present embodiment. As described above, with the hands-free device 1 and the cellular phone 2 connected to each other on HFP, the outgoing call processing can be performed by an operation on the operation unit 14 of the hands-free device 1. In addition to this, in the HFP-connected state, a hands-free telephone conversation may be able to be performed by performing outgoing call processing by an operation on the cellular phone 2.

In this case, the hands-free device 1 is required to acquire the outgoing call history data by this outgoing call processing and to perform processing to update it to the latest state. The hands-free device 1 can determine whether an outgoing call is its own outgoing call and is notified of the communication state of the cellular phone 2 by the HFP connection and can thus determine whether the outgoing call is an outgoing call by its own operating unit 14 or outgoing call processing by an operation on the cellular phone 2.

In FIG. 28, if the controller 12 determines that an outgoing call has occurred from the cellular phone 2 in the standby state (Yes at S1031), the controller 12 determines whether the outgoing call state has ended to shift to the standby state (S1032). As a situation causing this S1032, the controller 12 determines that the outgoing call state has shifted to the standby state without shifting to the telephone conversation state owing to the fact that the hands-free device 1 has canceled the outgoing call from the cellular phone 2, that the cellular phone 2 has canceled the outgoing call from itself, or that the outgoing call counterpart has rejected the incoming call, for example (Yes at S1032). Then, the hands-free device 1 acquires the outgoing call history data, the incoming call history data, the unattended incoming call history data, and the telephone directory data from the cellular phone 2 (S1033). Thus, each time an outgoing call from the cellular phone 2 ends, the hands-free device 1 can acquire the outgoing call history data, the incoming call history data, the unattended incoming call history data, and the telephone directory data from the cellular phone 2 and maintain these various kinds of data to be the same as the various kinds of data of the cellular phone 2. In this example, it is determined that the outgoing call state has shifted to the standby state at S1032; when it is detected that the standby state has become the outgoing call state, the process may advance to S1033.

Figure 29:
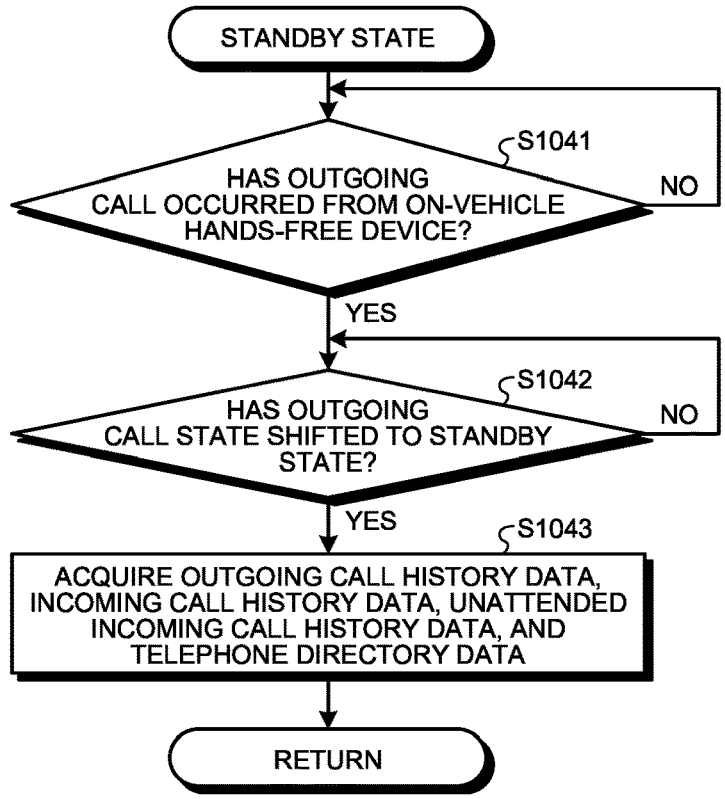
FIG. 29 is a flowchart of an exemplary procedure of data transfer processing when outgoing call processing is started by an operating unit of the hands-free device according to the third embodiment.

The following describes FIG. 29. FIG. 29 is a flowchart of an exemplary procedure of data transfer processing when outgoing call processing is started by the operating unit 14 of the hands-free device 1 according to the present embodiment.

In FIG. 28, the outgoing call operation by the cellular phone 2 is detected, and the data transfer processing is performed at S1033; FIG. 29 illustrates a case in which outgoing call processing is started by the operating unit 14 of the hands-free device 1.

In FIG. 29, if the controller 12 determines that an outgoing call has occurred from the hands-free device 1 in the standby state (Yes at S1041), the controller 12 determines whether the outgoing call state has ended to shift to the standby state (S1042). Examples of a situation causing this S1042 include the fact that the hands-free device 1 has canceled the outgoing call from the device, that the cellular phone 2 has canceled the outgoing call from the hands-free device 1, or that the outgoing call counterpart has reject the incoming call. If the controller 12 determines that the outgoing call state has shifted to the standby state without shifting to the telephone conversation state at S1042, the hands-free device 1 acquires the outgoing call history data, the incoming call history data, the unattended incoming call history data, and the telephone directory data from the cellular phone 2 (S1043). Thus, each time an outgoing call from the hands-free device 1 ends, the hands-free device 1 can acquire the outgoing call history data, the incoming call history data, the unattended incoming call history data, and the telephone directory data from the cellular phone 2 and maintain these various kinds of data to be the same as the various kinds of data of the cellular phone 2. In this example, it is determined that the outgoing call state has shifted to the standby state at S1042; when it is detected that the standby state has become the outgoing call state, the process may advance to S1043.

Figure 30:
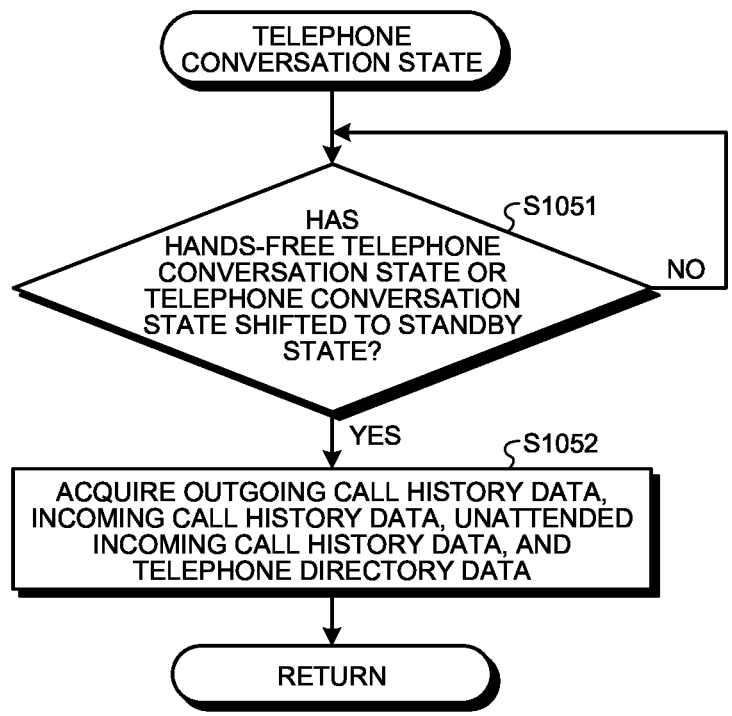
FIG. 30 is a flowchart of an exemplary procedure of processing to perform data transfer when a telephone conversation state has shifted to a standby state according to the third embodiment.

The following describes FIG. 30. FIG. 30 is a flowchart of an exemplary procedure of processing to perform data transfer when the telephone conversation state has shifted to the standby state according to the present embodiment. FIG. 30 is a modification of FIG. 28 and FIG. 29, which is not an example in which the outgoing call state has become the standby state without shifting to the telephone conversation state, in which the data transfer is performed when the telephone conversation state has shifted to the standby state.

In FIG. 30, if the controller 12 determines, in a hands-free telephone conversation state by the hands-free device 1 and the cellular phone 2 or a telephone conversation state by the cellular phone 2 alone, that the hands-free telephone conversation state or the telephone conversation state has shifted to the standby state owing to the fact that the hands-free device 1 has ended the telephone conversation, that the cellular phone 2 has ended the telephone conversation, or that the communication counterpart has ended the telephone conversation (Yes at S1051), the controller 12 acquires the outgoing call history data, the incoming call history data, the unattended incoming call history data, and the telephone directory data from the cellular phone 2 (S1052). Thus, each time a telephone conversation ends, the hands-free device 1 can acquire the outgoing call history data, the incoming call history data, the unattended incoming call history data, and the telephone directory data from the cellular phone 2 and maintain these various kinds of data to be the same as the various kinds of data of the cellular phone 2.

Figure 31:
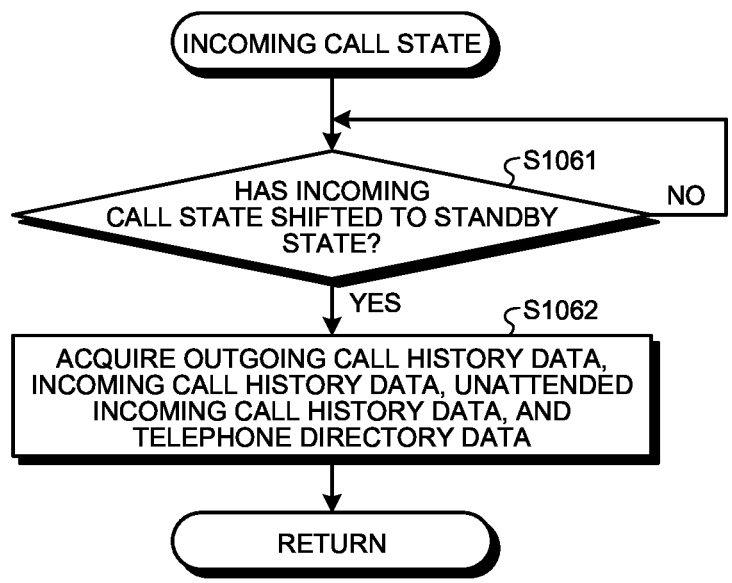
FIG. 31 is a flowchart of an exemplary procedure of processing at the time of an incoming call according to the third embodiment.

FIG. 31 is a flowchart of an exemplary procedure of processing at the time of an incoming call according to the present embodiment. In FIG. 31, if the controller 12 determines, in an incoming call state, that the incoming call state has shifted to the standby state owing to the fact that the hands-free device 1 has rejected the incoming call, that the cellular phone 2 has rejected the incoming call, that the outgoing call counterpart has canceled the outgoing call, or that after the incoming call a telephone conversation state is established, and then the telephone conversation has ended (Yes at S1061), the controller 12 acquires the outgoing call history data, the incoming call history data, the unattended incoming call history data, and the telephone directory data from the cellular phone 2 (S1062). Thus, each time an incoming call ends, the hands-free device 1 can acquire the outgoing call history data, the incoming call history data, the unattended incoming call history data, and the telephone directory data from the cellular phone 2 and maintain these various kinds of data to be the same as the various kinds of data of the cellular phone 2.

The data transfer can be performed immediately after the standby state has become the incoming call state; in the incoming call state alone it is unclear whether the incoming call is an unattended incoming call, in which the incoming call was not responded to, or a responded incoming call, in which the incoming call state has become the telephone conversation state. Given these circumstances, in the present embodiment, even in the case of the unattended incoming call, in which the incoming call state has become the standby state, when the incoming call state ends, the standby state is established; the responded incoming call ends the telephone conversation in any event to shift to the standby state; and thus the fact that the incoming call state has become the standby state is determined, and this is regarded as a trigger, whereby data about whether the incoming call is the unattended incoming call or the responded incoming call can be transferred from the cellular phone 2, and a display screen that enables recognition about whether the incoming call is the unattended incoming call or the responded incoming call can be generated.

Figure 32:
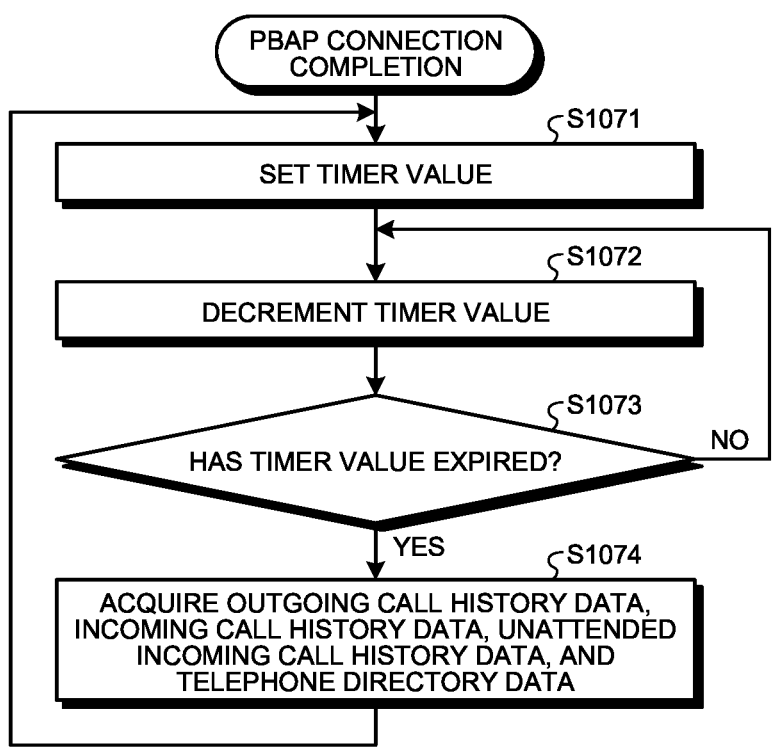
FIG. 32 is a flowchart of another exemplary start timing of data transfer according to the third embodiment.

FIG. 32 is a flowchart of another exemplary start timing of data transfer according to the present embodiment. FIG. 32 starts the data transfer using a timer without the communication state such as the outgoing call, the incoming call, or the telephone conversation set as certain timing. In FIG. 32, upon completing the PBAP connection, the controller 12 sets a timer value (S1071), decrements the timer value at certain time intervals (S1072), and, upon determining that the timer value has expired (S1073), acquires the outgoing call history data, the incoming call history data, the unattended incoming call history data, and the telephone directory data from the cellular phone 2 (S1074). Thus, the hands-free device 1 can regularly acquire the outgoing call history data, the incoming call history data, the unattended incoming call history data, and the telephone directory data from the cellular phone 2 and maintain these various kinds of data to be the same as the various kinds of data of the cellular phone 2.

Figure 33:
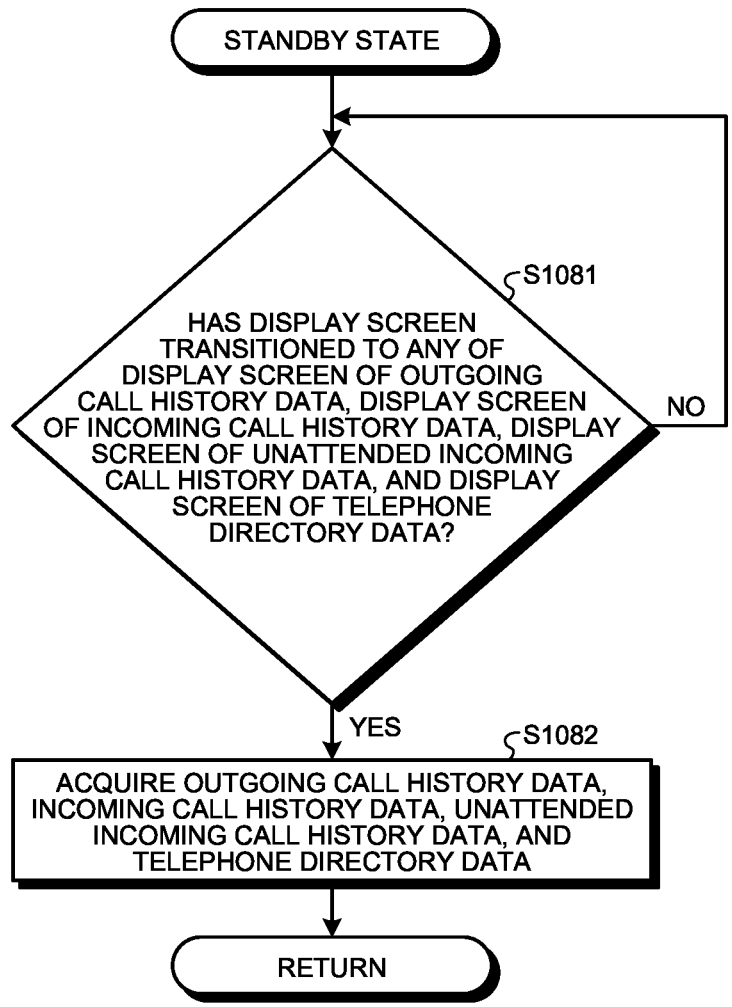
FIG. 33 is a flowchart of another exemplary start timing of data transfer according to the third embodiment.

FIG. 33 is a flowchart of another exemplary start timing of data transfer according to the present embodiment. FIG. 33 starts the data transfer with an operation on the operating unit 14 by the user as a trigger without the communication state such as the outgoing call, the incoming call, or the telephone conversation and the timer set as certain timing. In FIG. 33, if the controller 12 determines that the user has performed an operation to change a display screen to cause it to transition to any of a display screen of the outgoing call history data, a display screen of the incoming call history data, a display screen of the unattended incoming call history data, and a display screen of the telephone directory data (Yes at S1081), the controller 12 acquires the outgoing call history data, the incoming call history data, the unattended incoming call history data, and the telephone directory data from the cellular phone 2 (S1082). Thus, each time the display screen transitions to any of the display screen of the outgoing call history data, the display screen of the incoming call history data, the display screen of the unattended incoming call history data, and the display screen of the telephone directory data, the hands-free device 1 can acquire the outgoing call history data, the incoming call history data, the unattended incoming call history data, and the telephone directory data from the cellular phone 2 and maintain these various kinds of data to be the same as the various kinds of data of the cellular phone 2.

In the processing of FIG. 28 to FIG. 33, the hands-free device 1 receives the outgoing call history data, the incoming call history data, the unattended incoming call history data, and the telephone directory data on the certain timing. However, the telephone directory data takes time for processing to convert it into Vcard form, has a larger data amount than that of the outgoing call history data, the incoming call history data, and the unattended incoming call history data, thus has a large load on the cellular phone 2, and causes its battery capacity to reduce.

Given these circumstances, when the cellular phone 2 is wirelessly connected to the hands-free device 1 and the PBAP-based data transfer is performed, only the outgoing call history data, the incoming call history data, and the unattended incoming call history data may be data-transferred with the certain timing. Thus, the processing of the cellular phone 2 can be reduced, and the reduction in its battery capacity can be inhibited.

The hands-free device 1 receives the outgoing call history data, the incoming call history data, the unattended incoming call history data, and the telephone directory data on the certain timing. However, the hands-free device 1 can grasp whether the cellular phone 2 is in the incoming call state or the outgoing call state as described above, and thus when an incoming call occurs, only the incoming call history data and the unattended incoming call history data may be transferred, whereas when an outgoing call occurs, only the outgoing call history data may be transferred. Consequently, useless data transfer can be omitted, the processing of the cellular phone 2 can be reduced, and the reduction in its battery capacity can be inhibited.

The processing described with reference to FIG. 28 to FIG. 33 may be performed singly or performed with a plurality of pieces of them combined with each other. FIG. 28 to FIG. 32 in particular may all be executed.

The present embodiment describes the transfer timing of the outgoing call history data, the incoming call history data, the unattended incoming call history data, and the telephone directory data; the transfer timing of the message record data and the answerphone data may also be changed.

A computer program executed by the hands-free device 1 of the embodiments described above is embedded and provided in a ROM, for example. The computer program executed by the hands-free device 1 of the embodiments described above may be recorded and provided in a computer-readable recording medium such as a compact disc read only memory (CD-ROM), a flexible disk (FD), a compact disc recordable (CD-R), or a digital versatile disc (DVD) as an installable or executable file.

The computer program executed by the hands-free device 1 of the embodiments described above may be stored in a computer connected to a network such as the Internet and provided by being downloaded via the network. The computer program executed by the hands-free device 1 of the embodiments described above may be provided or distributed via a network such as the Internet.

First Modification

In the first embodiment described above, the display control module 105 of the hands-free device 1 displays the pop-up image 153 providing notification of the presence of the answerphone records on the display unit 15; the method for providing notification of the presence of the answerphone records is not limited thereto. The display control module 105 may cause the display unit 15 to display an icon also for the answerphone records like the voice message, for example.

Figure 34:
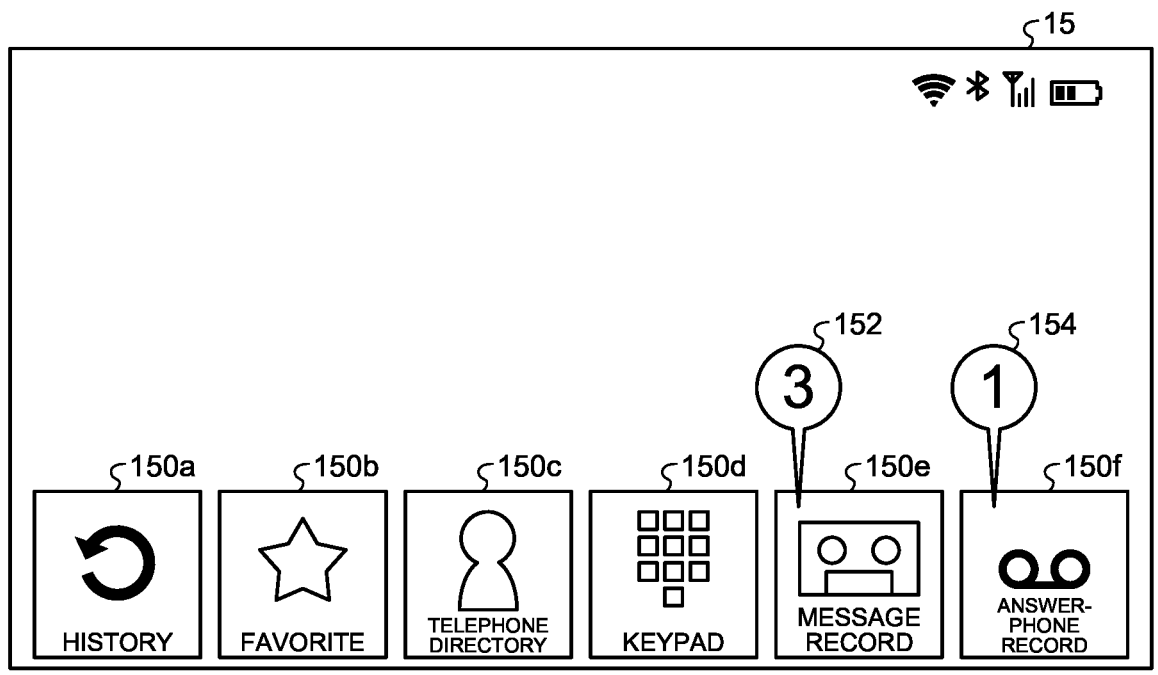
FIG. 34 is a diagram of an exemplary display screen providing notification of the answerphone record according to a first modification.

FIG. 34 is a diagram of an exemplary display screen providing notification of the answerphone record according to the present modification. As illustrated in FIG. 34, the display control module 105 may cause the display unit 15 to display an icon 150f representing the answerphone record.

When there are any answerphone records, the display control module 105 may blink the icon 150f or change the color of the icon 150f. The display control module 105 does not necessarily cause the display unit 15 to display the icon 150f when the hands-free device 1 does not store therein any answerphone data and may cause the display unit 15 to display the icon 150f only when the hands-free device 1 stores therein the answerphone data.

The display control module 105 may acquire the number of the answerphone records from the answerphone data stored in the hands-free device 1 and display the number as a number notification image 154. The number notification image 154 represents the number of answerphone records that have not yet been reproduced by the user out of answerphone record histories acquired from the cellular phone 2 by the hands-free device 1, for example.

Second Modification

In the embodiments described above, the hands-free device 1 is installed in the vehicle 3; the hands-free device 1 is not limited to an on-vehicle apparatus. The hands-free device 1 may be able to be used when the user holds a telephone conversation in a hands-free manner outside the vehicle 3, for example.

Third Modification

In the embodiments described above, the hands-free device 1 is implemented as one function of the on-vehicle navigation apparatus installed in the vehicle 3; the configuration is not limited thereto. The hands-free device 1 may be formed by an exclusive hands-free device mainly implementing a hands-free function or may be an apparatus installing a hands-free function in an on-vehicle audio apparatus reproducing compact discs (CDs) or radio. The hands-free device 1 may have portability (be of a portable type).

Fourth Modification

In the embodiments described above, the second data transfer control module 104 of the hands-free device 1 receives the message record data including the voice data such as the message record from the cellular phone 2 and stores it in the working memory 16 or the storage memory 17 within the hands-free device 1. In the embodiments described above, the reproduction module 106 identifies the voice data of the message record corresponding to the telephone number or the registered name selected by the user out of the message record data stored in the working memory 16 or the storage memory 17 and reproduces the voice data from the speaker 19; the method for reproducing the voice message is not limited thereto.

The voice data is not necessarily included, for example. More specifically, the message record data of the present modification includes the telephone number of the outgoing call source of the message record received by the cellular phone 2 and a time at which the message record was registered in the cellular phone 2. When the telephone number or the registered name of the caller who registered the message record is selected by the user, the reproduction module 106 may access the cellular phone 2 and reproduce the voice data of the message record from the cellular phone 2 in a streamed manner. In this case, the voice data of the message record is not necessarily stored in the working memory 16 or the storage memory 17 of the hands-free device 1.

Fifth Modification

In the embodiments described above, the reception module 101, the hands-free telephone conversation connection module 102, the first data transfer control module 103, the second data transfer control module 104, the display control module 105, the reproduction module 106, and the deletion module 107 are implemented by reading the computer program from the storage memory 17 and executing it by the controller 12; these functions may be implemented by a hardware circuit.

Other Modifications

The hands-free device 1 may store the outgoing call history data, the incoming call history data, the telephone directory data, the message record data, and the answerphone data received from the cellular phone 2 in the storage memory 17 and, each time the outgoing call history data, the incoming call history data, the telephone directory data, the message record data, and the answerphone data are received from the cellular phone 2, store the outgoing call history data, the incoming call history data, the telephone directory data, the message record data, and the answerphone data received from the cellular phone 2 in an updated manner. The outgoing call history data, the incoming call history data, the telephone directory data, the message record data, and the answerphone data received from the cellular phone 2 may be stored in both the working memory 16 and the storage memory 17 with the storage memory 17 used as a backup memory.

The number of the outgoing call history data or the incoming call history data that can be stored in the working memory 16 may be one. In this case, when the outgoing call processing or the incoming call processing by the hands-free device 1 occurs, the outgoing call history data or the incoming call history data received by the PBAP-based wireless communication connection is necessarily deleted.

The hands-free device 1 simultaneously displays a plurality of pieces of outgoing call history data and a plurality of pieces of incoming call history data; they may be displayed one by one. In this case, first, the latest data may be displayed, and then the second latest data may be successively displayed by an operation on the operating unit 14, for example.

In the embodiments described above, when the cellular phone 2 and the hands-free device 1 establish the Bluetooth communication line, the various kinds of data are automatically transferred; the transfer processing may be executed manually by the user. The outgoing call history data, the incoming call history data, the telephone directory data, the message record data, and the answerphone data may be transferred on the condition that the user operates the hands-free device 1 or the cellular phone 2, for example.

When the outgoing call history data, the incoming call history data, the telephone directory data, the message record data, and the answerphone data received from the cellular phone 2 are stored in the working memory 16 in a distinguished manner for each cellular phone 2, the cellular phone 2 and the data stored in the working memory 16 may be associated with each other not only by associating them with each other by the method generating the link key but also by another method.

The hands-free device according to the present disclosure enables a user to reproduce a voice message or check the contents of an answerphone record when performing communication connection with a cellular phone pursuant to HFP and PBAP.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free device comprising:
   a memory; and
   a processor coupled to the memory and configured to:
      connect to a cellular phone in a hands-free telephone conversation-enabled manner pursuant to Hands-Free Profile (HFP);
      receive from the cellular phone unattended incoming call history data, message record data, and at least one of outgoing call history data, incoming call history data, and telephone directory data stored in the cellular phone by a communication protocol pursuant to Phone Book Access Profile (PBAP);
      determine presence or absence of an unattended incoming call based on the unattended incoming call history data;
      determine, only when the cellular phone has the presence of the unattended incoming call, presence or absence of a voice message or an answerphone record based on the message record data without determining the presence or the absence of the unattended incoming call; and
      receive, when the cellular phone has the presence of the voice message or the answerphone record, at least one of information on the voice message and information on the answerphone record from the cellular phone.

2. The hands-free device according to claim 1, wherein the processor is further configured to cause a display to display a notification of the voice message or the answerphone record when receiving the at least one of the information on the voice message and the information on the answerphone record from the cellular phone.

3. The hands-free device according to claim 2, wherein the processor is further configured to cause the display to display an icon providing a notification of the presence of the voice message or the answerphone record.

4. The hands-free device according to claim 2, wherein the processor is further configured to cause the display to display a pop-up image providing notification of the presence of the answerphone record on a standby screen in a manner of superimposing the pop-up image on the standby screen.

5. The hands-free device according to claim 3, wherein the processor is further configured to cause the display to display a pop-up image providing notification of the presence of the answerphone record on a standby screen in a manner of superimposing the pop-up image on the standby screen.

6. The hands-free device according to claim 1, wherein the processor is further configured to:
   receive an operation to reproduce the voice message from a user; and
   reproduce the voice message when receiving the operation to reproduce the voice message.

7. The hands-free device according to claim 1, wherein the processor is further configured to:
   receive an operation to reproduce the answerphone record from a user; and
   access an answerphone service via the cellular phone when receiving the operation to reproduce the answerphone record.

8. A data transfer method comprising:
   connecting to a cellular phone in a hands-free telephone conversation-enabled manner pursuant to Hands-Free Profile (HFP);
   receiving from the cellular phone unattended incoming call history data, message record data, and at least one of outgoing call history data, incoming call history data, and telephone directory data stored in the cellular phone by a communication protocol pursuant to Phone Book Access Profile (PBAP);
   determining presence or absence of an unattended incoming call based on the unattended incoming call history data;
   determining, only when the cellular phone has the presence of the unattended incoming call, presence or absence of a voice message or an answerphone record based on the message record data without determining the presence or the absence of the unattended incoming call; and
   receiving, when the cellular phone has the presence of the voice message or the answerphone record and from the cellular phone, at least one of information on the voice message received by the cellular phone and information on the answerphone record received by the cellular phone.

9. A computer program product including programmed instructions embodied in and stored on a non-transitory computer readable medium, wherein the programmed instructions, when executed by a computer, cause the computer to perform:
   connecting to a cellular phone in a hands-free telephone conversation-enabled manner pursuant to Hands-Free Profile (HFP);
   receiving from the cellular phone unattended incoming call history data, message record data, and at least one of outgoing call history data, incoming call history data, and telephone directory data stored in the cellular phone by a communication protocol pursuant to Phone Book Access Profile (PBAP);
   determining presence or absence of an unattended incoming call based on the unattended incoming call history data;
   determining, only when the cellular phone has the presence of the unattended incoming call, presence or absence of a voice message or an answerphone record based on the message record data without determining the presence or the absence of the unattended incoming call; and
   receiving, when the cellular phone has the presence of the voice message or the answerphone record and from the cellular phone, at least one of information on the voice message received by the cellular phone and information on the answerphone record received by the cellular phone.

* * * * *